United States Patent [19]
Imai et al.

[11] 4,171,902
[45] Oct. 23, 1979

[54] INFORMATION PROCESSING SYSTEM HAVING AN OPTIC AXIS ADJUSTING MIRROR DEVICE

[75] Inventors: Nóbuhiro Imai, Kawasaki; Kazuhiro Hirayama, Yokohama; Junji Ichikawa, Kawasaki; Takehiko Kiyohara, Zama; Katsumi Masaki, Kodaira, all of Japan

[73] Assignee: Canon Kabushiki Kaisha, Tokyo, Japan

[21] Appl. No.: 766,216

[22] Filed: Feb. 7, 1977

[30] Foreign Application Priority Data

Feb. 19, 1976 [JP] Japan .................................. 51/17318
Mar. 11, 1976 [JP] Japan .................................. 51/26578

[51] Int. Cl.² ........................ G03G 15/00; G01B 11/26; G01C 1/00
[52] U.S. Cl. .................................. 355/11; 350/285; 355/3 R; 356/138
[58] Field of Search ............... 355/3 R, 11; 350/288, 350/293, 285; 356/138, 172

[56] References Cited
U.S. PATENT DOCUMENTS

| | | | |
|---|---|---|---|
| 3,358,081 | 12/1967 | Young et al. | 355/3 R X |
| 3,404,352 | 10/1968 | Bowness | 350/288 X |
| 3,574,448 | 4/1971 | Petersen et al. | 350/288 X |
| 3,683,297 | 8/1972 | Hobart et al. | 350/288 X |
| 3,813,170 | 5/1974 | Sears | 356/138 |
| 3,898,627 | 8/1975 | Hooker et al. | 355/3 R X |
| 3,915,575 | 10/1975 | Sick | 356/138 X |
| 3,920,335 | 11/1975 | Seehase | 356/138 |
| 4,046,471 | 9/1977 | Branham et al. | 355/3 R X |
| 4,070,681 | 1/1978 | Ichikawa et al. | 346/160 |

*Primary Examiner*—Fred L. Braun
*Attorney, Agent, or Firm*—Fitzpatrick, Cella, Harper & Scinto

[57] ABSTRACT

An optic axis adjusting mirror device used with a system in which a light beam such as a laser beam or the like is used and modulated by information signals and caused to scan a medium by a scanning optical system. The device includes an adjuster capable of freely adjusting the angle at which the mirror is mounted to vary the direction of reflection of the light beam as it impinges on the mirror, and detecting jigs for detecting the position of the light beam as it impinges on the mirror and for detecting whether or not the optic axis lies at a predetermined position. The device contributes to highly accurate beam scanning.

25 Claims, 25 Drawing Figures

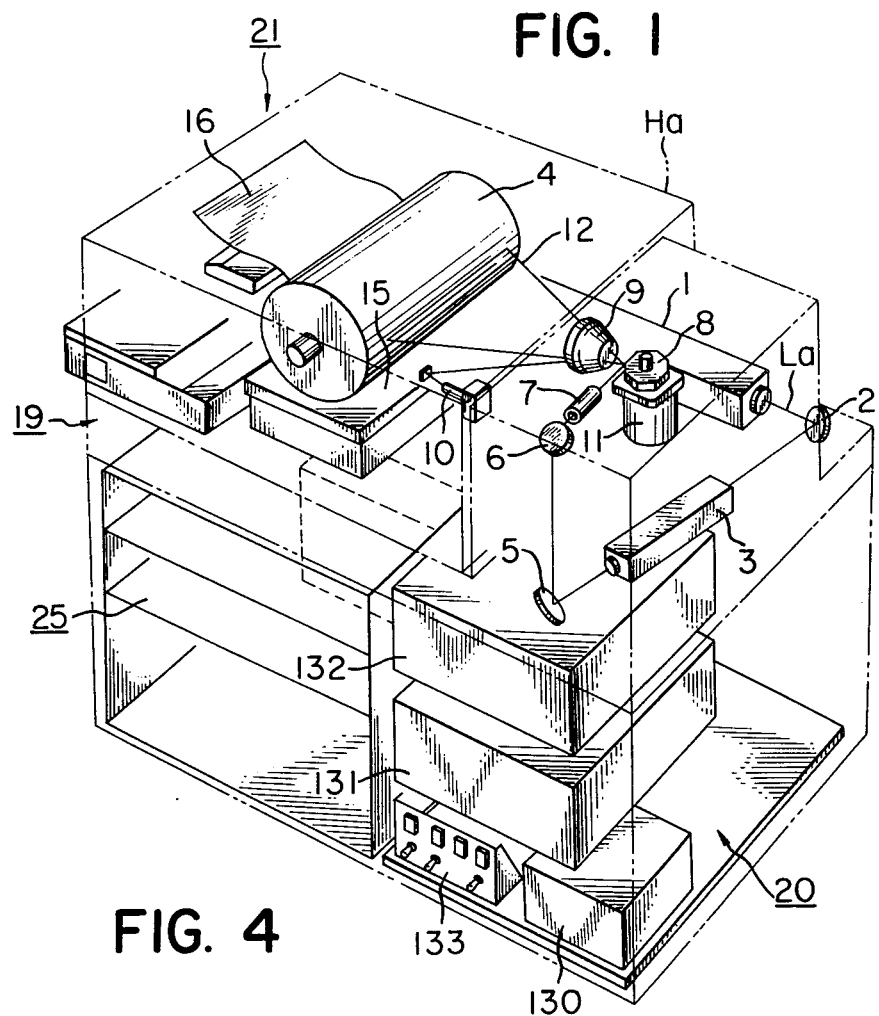
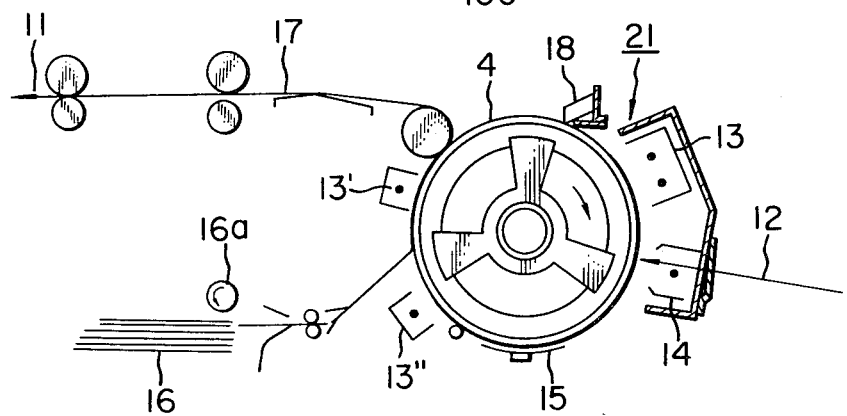

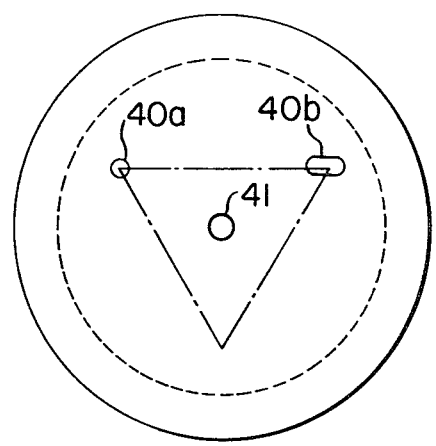
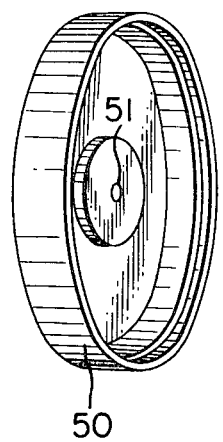
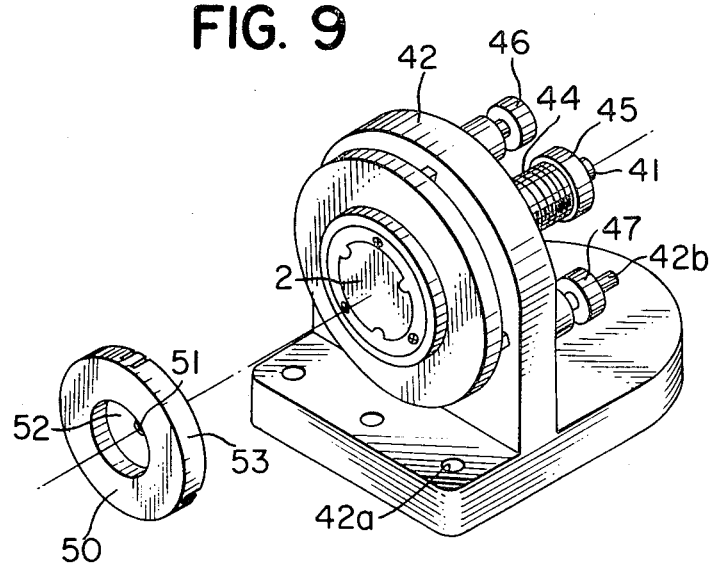

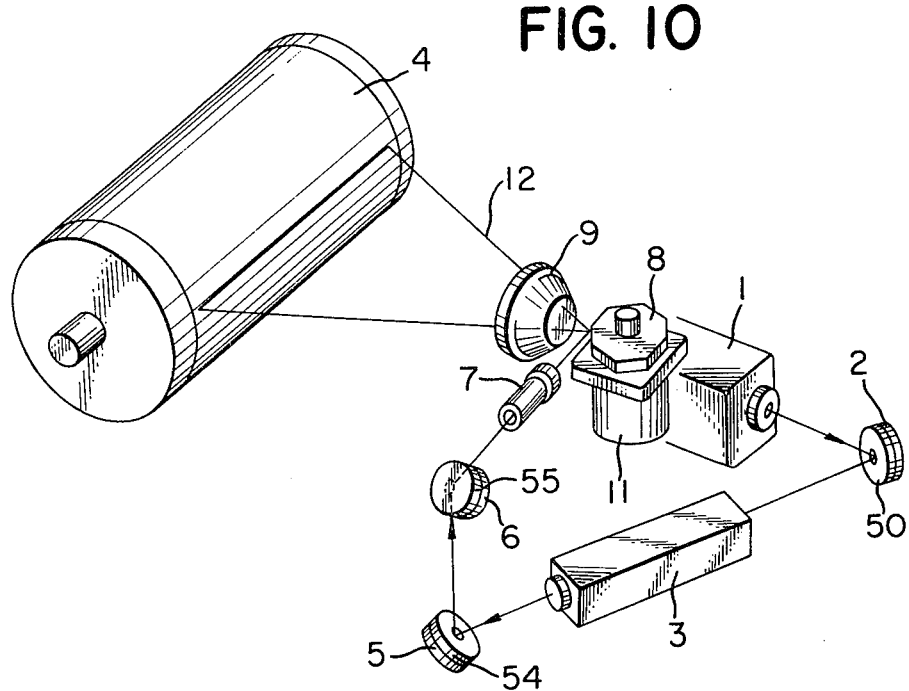
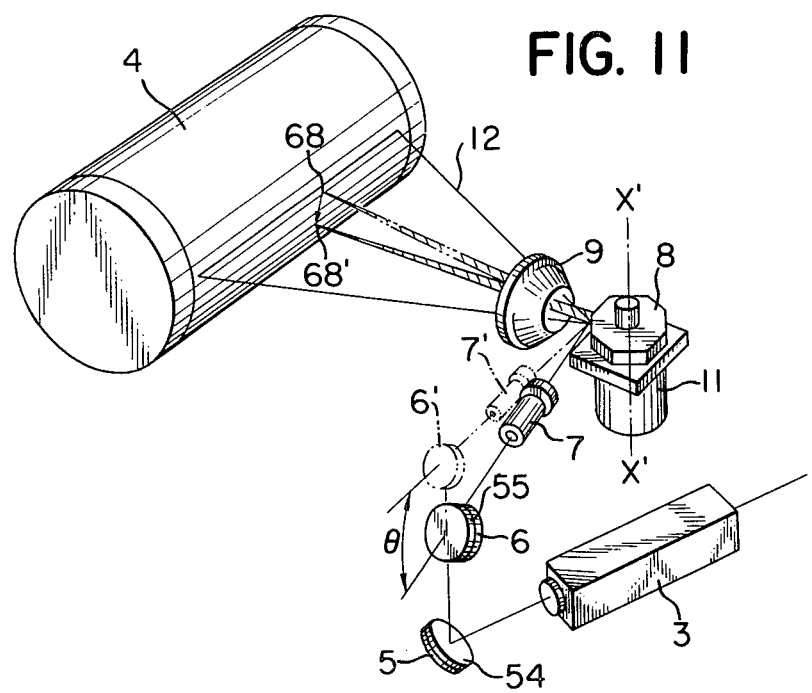

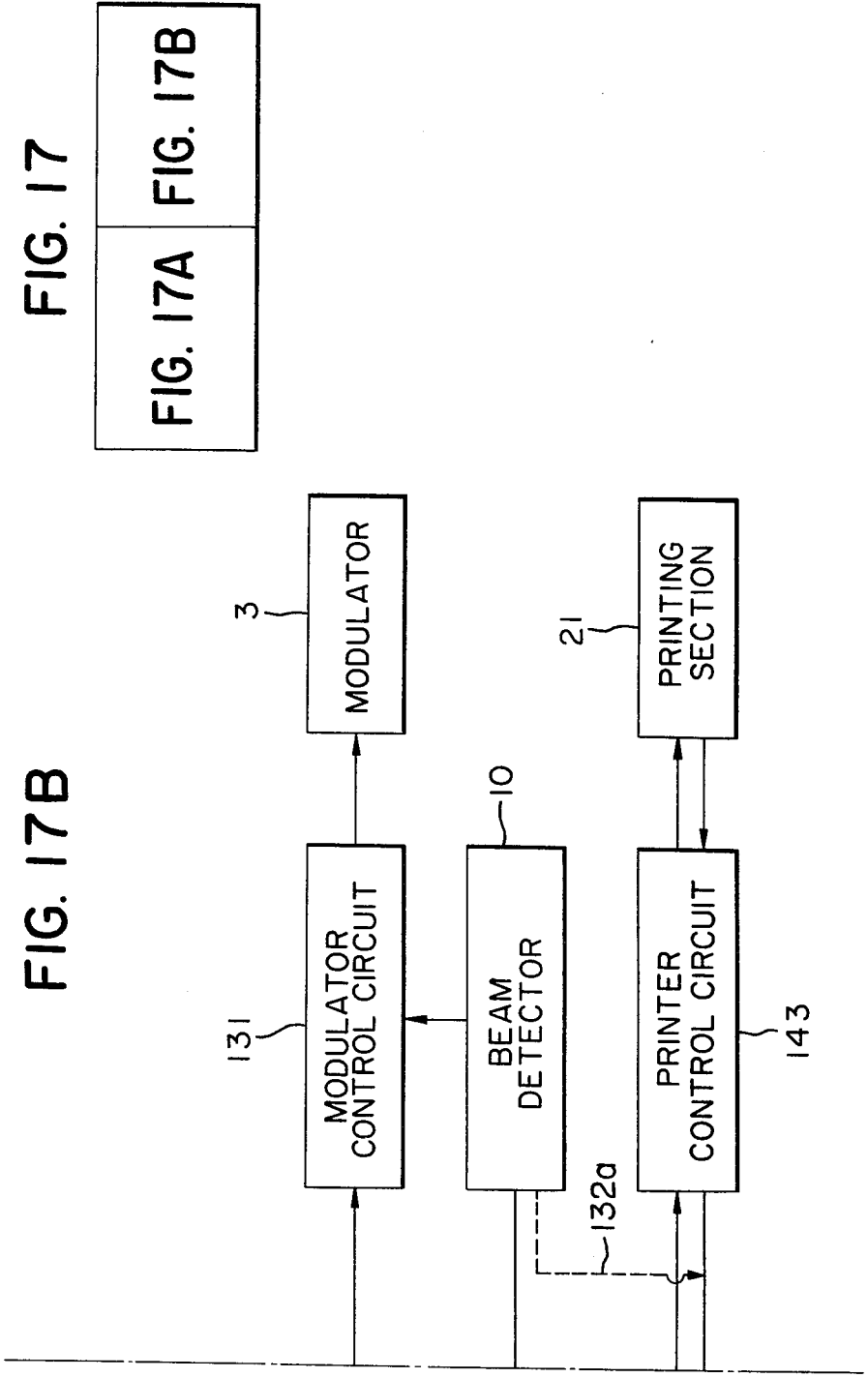

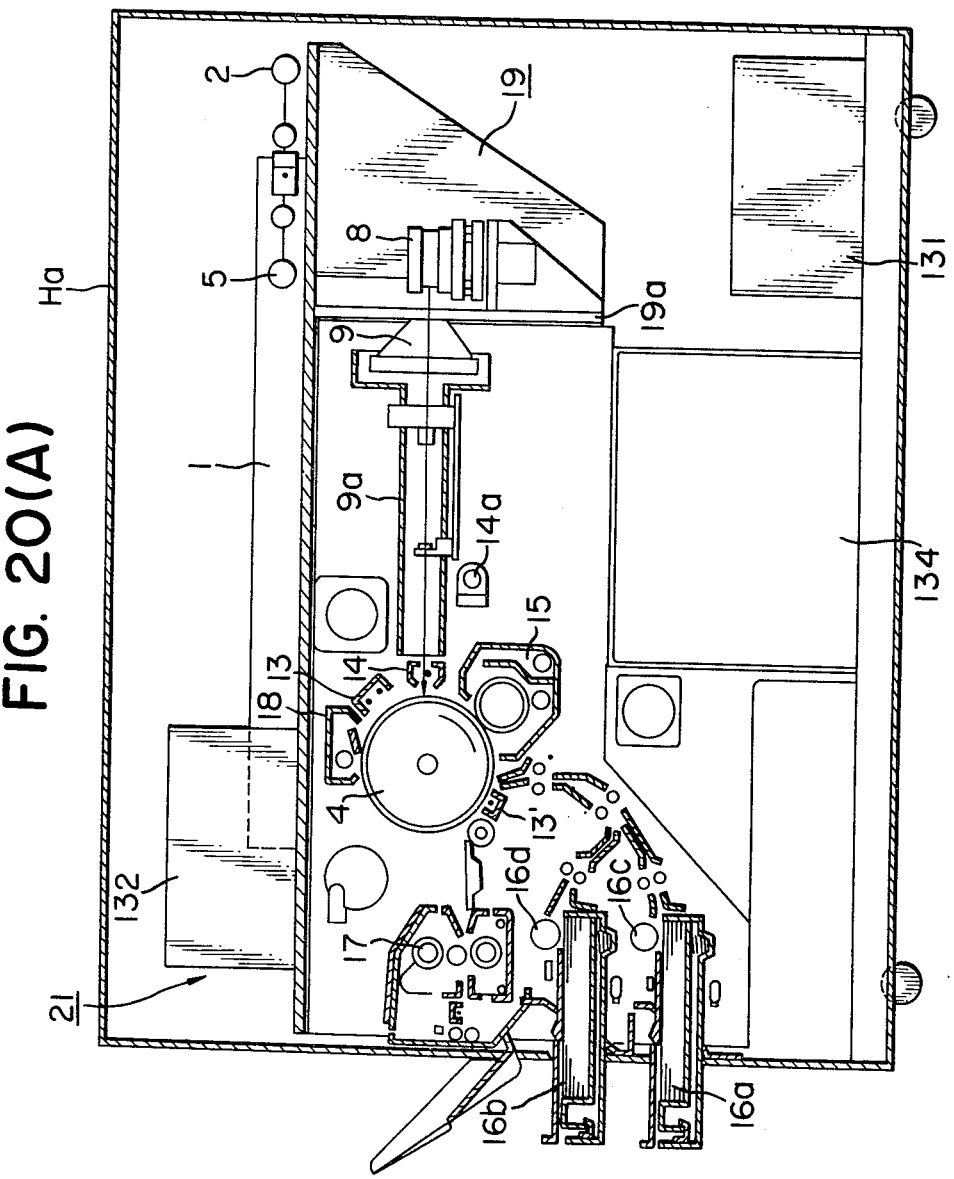

INFORMATION PROCESSING SYSTEM HAVING AN OPTIC AXIS ADJUSTING MIRROR DEVICE

BACKGROUND OF THE INVENTION

1. Field of the Invention

This invention relates to an information processing system having an optic axis adjusting mirror device. More particularly, it relates to an optic axis adjusting mirror device applicable to a compact recording apparatus which is capable of rapidly reproducing image information such as alphanumeric characters, patterns, etc. from an electronic computer, a facsimile image transmitter or the like. The recording apparatus of such type may be, for example, an information recording or processing apparatus such as an apparatus which deflects and modulates a light beam such as laser beam or the like by the image information such as patterns, characters, etc. from an electronic computer, a facsimile image transmitter or the like and uses the image transfer type electrophotography to put out hard copies of good quality at high speed.

2. Description of the Prior Art

Along with the enhanced performance of the electronic computer, it has been desired in recent years to develop an output device capable of putting out image information such as patterns, characters, etc. at high speed and with a good quality. As a device exclusively for putting out character information at high speed, there is known the mechanical impact line printer of the drum type, the multistylus electrostatic printer, the CRT printer comprising a combination of CRT (chiefly OFT) and electrophotography, or the like.

However, the mechanical impact line printer is limited in speed and suffers from the disadvantages of keen noise and low reliability.

The multistylus electrostatic printer is limited in resolving power. It also suffers from a disadvantage that expensive electrostatic recording paper must be used as the recording paper. The CRT printer encounters difficulties in maintaining the printing condition of good quality for a long time because of the required stability of the CRT driver circuit, and also suffers from the bulkiness of the CRT which in turn leads to the extreme bulkiness of the entire apparatus. Thus, the pattern or character output devices according to the various conventional systems have offered various difficulties in putting out characters (particularly such as Chinese characters) with good quality and at high speed. Further, the devices exclusively for putting out pattern information have heretofore included the mechanical X-Y plotter, the drafter, the multistylus electrostatic plotter, and the CRT plotter which optically records the pattern information displayed on a display CRT, but the mechanical X-Y plotter and the drafter have been disadvantageous in their very low speed of recording, the multistylus electrostatic plotter has suffered from the disadvantages of low resolving power and special expensive paper to be used as the recording paper, and the CRT plotter has had demerits resulting from such factors such as the low resolving power of the CRT itself, the low stability and the insufficient quantity of light.

Also, the optic axis adjusting device heretofore applied to the optical apparatus has resorted to a complex mechanism and its adjustment to effect the adjustment of the optic axis in the X- and Y-directions, but such device has been hardly applicable to the information recording or display or otherwise processing system having numerous points of the optic axis to be adjusted, as described above.

For example, there are well-known adjustable devices as disclosed in U.S. Pat. Nos. 3,881,107; 3,871,771; 3,537,777; and 3,890,033, whereas for the reason set forth above, these are unsuitable or hardly applicable to the information processing system to which the present invention relates.

SUMMARY OF THE INVENTION

It is an object of the present invention to eliminate the above-noted disadvantages and to provide a highly reliable information processing system in which the optic axis is adjustable in a simple manner.

It is another object of the present invention to provide, in an information recording or display system using a light beam such as a laser beam or the like, a device which is capable of detecting the optic axis of the light beam by simple means.

It is still another object of the present invention to provide, in an information processing system using a light beam, a device which uses an optic axis adjusting mirror to enhance the reliability with which the light beam is processed.

It is yet still another object of the present invention to provide a system which uses a mirror adjusting device provided with a three-point support adjust member to enable the optic axis to be adjusted at any suitable time.

It is a further object of the present invention to provide a device capable of detecting and adjusting the optic axis which is applicable to an information processing system including a scanning optical system, for example, an information recording or display system using a laser beam.

It is a further object of the present invention to provide, in an information recording apparatus using a laser beam, a system which is capable of detecting and thereafter adjusting the optic axis of the beam by using, as an optical mirror adjusting mechanism, adjuster means comprising an optical mirror adjustably supported by a three-point support member and requiring no special locking mechanism, and means used therewith to detect the optic axis of the beam.

Other objects of the present invention will become apparent from the following detailed description of the invention taken in conjunction with the accompanying drawings.

BRIEF DESCRIPTION OF THE DRAWING

FIG. 1 is a perspective view showing the basic construction of an embodiment of the information recording apparatus to which is applied the optic axis adjusting mirror device according to the present invention.

FIG. 4 illustrates an example of adopting electrophotography to the apparatus of FIG. 1.

FIG. 7(C) is a rear side view of the mirror holder shown in FIG. 7(A).

FIG. 8 is a perspective view of the optic axis detecting means mountable to the mirror holder shown in FIG. 7(A).

FIG. 9 is a pictorial perspective view showing the mirror holder and the optic axis detecting jig separately.

FIG. 10 is a perspective view illustrating an example of the optic axis adjustment effected by the use of the mirror holder and optic axis detecting jig shown in FIGS. 7 to 9.

FIG. 11 shows, in perspective view, a form of the means for removing ghost images which is applicable to the apparatus shown in FIGS. 1 and 10.

FIG. 17 is a diagram of the relative positions of FIGS. 17A and 17B.

DESCRIPTION OF THE PREFERRED EMBODIMENT

The invention will hereinafter be described in detail with respect to its embodiments and in conjunction with the drawings. FIG. 1 cubically shows the basic construction of an embodiment and FIG. 2 is a right-hand side view thereof.

Optical System and Its Arrangement

Figure 2:
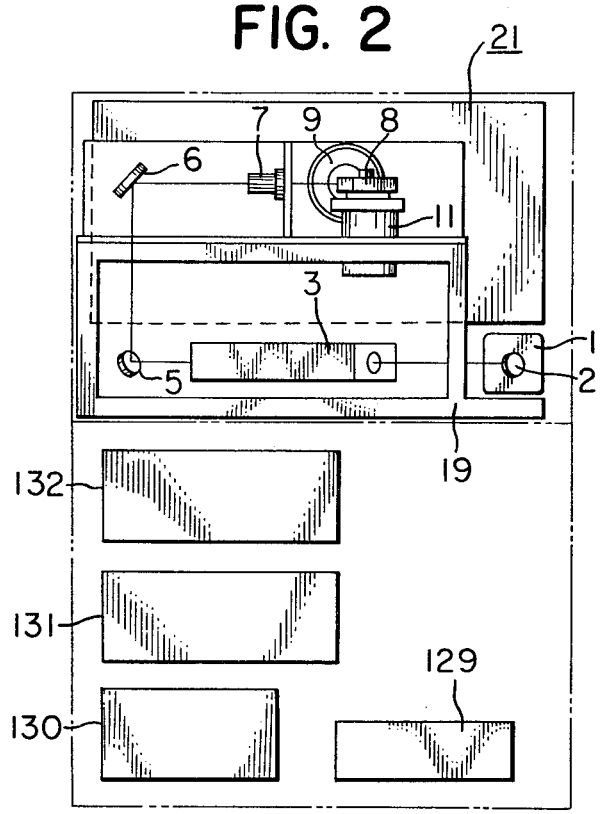
FIG. 2 is a right-hand side view corresponding to FIG. 1.
Figure 3:
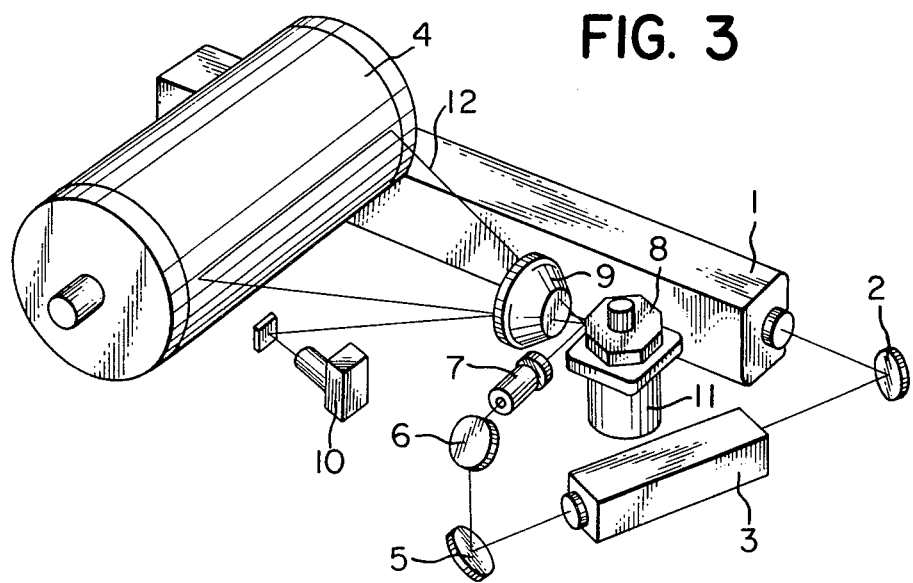
FIG. 3 is a perspective view schematically showing the major portions of the light beam source of the FIG. 1 apparatus, the elements forming the intermediate optical path thereof, the photosensitive recording medium, etc.

In FIGS. 1 and 2, a laser oscillator 1 is disposed below a photosensitive drum 4 for electrophotography rotatably supported within a housing Ha, and a laser beam La oscillated by the laser oscillator is directed to the input aperture of a beam modulator 3 via a mirror 2 which will further be described. The mirror 2, which is inserted to deflect the optical path in a horizontal direction to reduce the space occupied by the apparatus and to align the optic axis of the laser beam La with the input aperture of the modulator 3, will later be described as to how the mirror is held. The modulator 3 may be a well-known acousto-optic modulation element utilizing the acousto-optic effect or a well-known electro-optic element utilizing the electro-optic effect. In the modulator 3, the laser beam is subjected to intense or weak modulation in accordance with the input signals to the modulator 3. The laser beam from the modulator 3 is deflected in a vertical direction by a mirror 5 and further deflected in a horizontal direction by a mirror 6, whereafter the laser beam is directed to a beam expander system 7. The mirrors, 2, 5 and 6, which will further be described, are movable in the directions of X-Y and have their reflecting surfaces rotatable, so that irrespective of the direction of the emergent beam from the modulator 3, the laser beam La may be caused to enter the expander 7 perpendicularly to the optic axis thereof by adjusting the positions of the mirrors 5 and 6 independently. By the beam expander 7, the laser beam has its beam diameter expanded while remaining a parallel beam. The laser beam having its beam diameter so expanded impinges on a polygonal rotatable mirror 8 having a plurality of mirrored surfaces. The polygonal rotatable mirror 8 is mounted on a shaft supported by means of a high-precision bearing (e.g. pneumatic bearing), and driven by a constant-speed motor 11 (such as a hysteresis synchronous motor or DC servomotor). The laser beam leaving the beam expander 7 is horizontally swept by the polygonal rotatable mirror 8. The laser beam emergent from the polygonal rotatable mirror 8 is focused as a spot light on the photosensitive drum 4 by a focusing lens 9 having the f-$\theta$ characteristic which will later be described. In the common focusing lens, when the incidence angle of light is $\theta$, there is the following relation with respect to the position f on the image plane at which the image is focused:

$$r = f \cdot \tan \theta \qquad (1)$$

(f: the focal length of the focusing lens) and thus, the laser beam reflected by the polygonal rotatable mirror rotating at a constant velocity as in the present embodiment has its angle of incidence on the focusing lens 9 varied with time in accordance with the relation of equation (1). Therefore, the velocity of movement of the spot focused on the photosensitive drum 4 which is the image plane is varied non-linearly and is not constant. In other words, the velocity of movement is increased at a point where the angle of incidence becomes greater. Thus, if the laser beam is turned on at a predetermined time interval and a row of spots is depicted on the photosensitive drum 4, the intervals between these spots are wider toward the opposite ends than at the middle portion of the row. To avoid such a phenomenon, the focusing lens is designed to have the following characteristic:

$$r = f \cdot \theta \qquad (2)$$

Such a focusing lens is called the f-$\theta$ lens.

Further, when a parallel beam is focused as a spot by a focusing lens, the minimum diameter dmin of the spot is given by $$d_{min} = k \cdot f \cdot \lambda / A \qquad (3)$$

where f is the focal length of the image focusing lens, $\lambda$ is the wavelength of the light, A is the entrance aperture of the focusing lens, and k is a constant. Thus, when f and $\lambda$ are constant, a smaller spot diameter dmin may be obtained by increasing A. The aforementioned beam expander 7 is used to impart such effect. Therefore, where the necessary dmin may be obtained by the beam diameter of the laser oscillator, the beam expander 7 may be omitted.

A beam detector 10, which will further be described, comprises a mirror, a small entrance slit and a quickly responsive photoelectric conversion element (e.g. PIN diode). The beam detector 10 detects the position of the laser beam 12 as it is swept and the detection signal thereof determines the start timing for the input signal to the modulator 3 for imparting desired light information to the photosensitive drum. By this, the horizontal missynchronization between signals resulting from the error of division accuracy and irregularity of rotation of the reflecting surfaces of the polygonal rotatable mirror 8 can be greatly reduced to ensure the formation of images of good quality and to increase the allowance of the accuracy required of the polygonal rotatable mirror 8 and the drive motor 11, thus enabling less expensive manufacture of these.

The laser beam 12 so modulated is thrown upon the photosensitive drum 4 to form an electrostatic latent image thereon, which is then developed into a visible image through an electrophotographic process, whereafter the visible image is transferred to and fixed on a sheet of plain paper and this is put out as a hard copy.

A recording section 21 will now be described by reference to FIG. 4.

The method disclosed in our U.S. Pat. No. 3,666,363 specification will be taken as an example of an electrophotographic process applicable to the present embodiment. The insulative layer surface of a drum-shaped photosensitive plate 4 basically comprising a conductive back-up member, a photoconductive layer and an insulative layer is uniformly pre-charged to the positive or the negative polarity by a first corona charger 13 to cause charges opposite in polarity to said charging polarity to be captured in the interface between the photoconductive layer and the insulative layer or in the interior of the photoconductive layer, whereafter the laser beam 12 is thrown upon the charged insulative layer surface while, at the same time, AC corona charge is applied to the same surface by an AC corona discharger 14 to thereby form on the insulative layer surface a pattern resulting from the surface potential difference created in accordance with the light-and-dark pattern of the laser beam 12, and then the insulative layer surface is uniformly exposed to light to thereby cause an electrostatic image with high contrast to be formed on the insulative layer surface, whereafter the electrostatic image is developed into a visible image by a developing device 15 (which is shown as the wet type developing device but may be of the dry type) with the aid of developer composed chiefly of charged toner particles, and then the visible image passes by precharge means 13" and is transferred onto a transfer medium 16 such as a paper or the like by transfer means 13' and through utilization of an internal or an external electric field or the like, whereafter the transfer image is fixed by fixing means such as infrared ray lamp or heating plate to thereby provide an electrophotographically printed image, while on the other hand, after the image transfer, the insulative layer surface is cleaned by a cleaning device 18 to remove any residual charged particles, thus rendering the photosensitive plate 4 ready for reuse.

The electrophotographic process applicable to the present embodiment is not restricted to the above-described process but, for example, the process as disclosed in British Pat. No. 1,165,405 specification and other well-known processes may equally be applicable.

FIGS. 1 and 2 include a support structure or bed 19 for accommodating therein the above-described various means for setting the path of the laser beam, an electrical control section 20, a laser beam recording section 21 and a section 25 for accommodating other accessories.

In the electrical control section 20, there is disposed a driver 130 including a power source section 129 for the entire apparatus and a laser driving power source, a driver 131 for the above-described modulator, a driver 132 for the polygonal rotatable mirror, a maintenance switch 133, and a driver 134 for the corona charger.

The accessory accommodating section 25 is located on this side of the apparatus as viewed in FIG. 1 and below the recording section, and the interior space thereof is divided so as to accommodate therein the expendables such as paper, toner, etc. used for the electrophotographic copying.

Reference will now be had to FIGS. 1 through 5 to describe the mechanical construction and arrangement of the present embodiment.

Mechanical Construction and Arrangement

Figure 5:
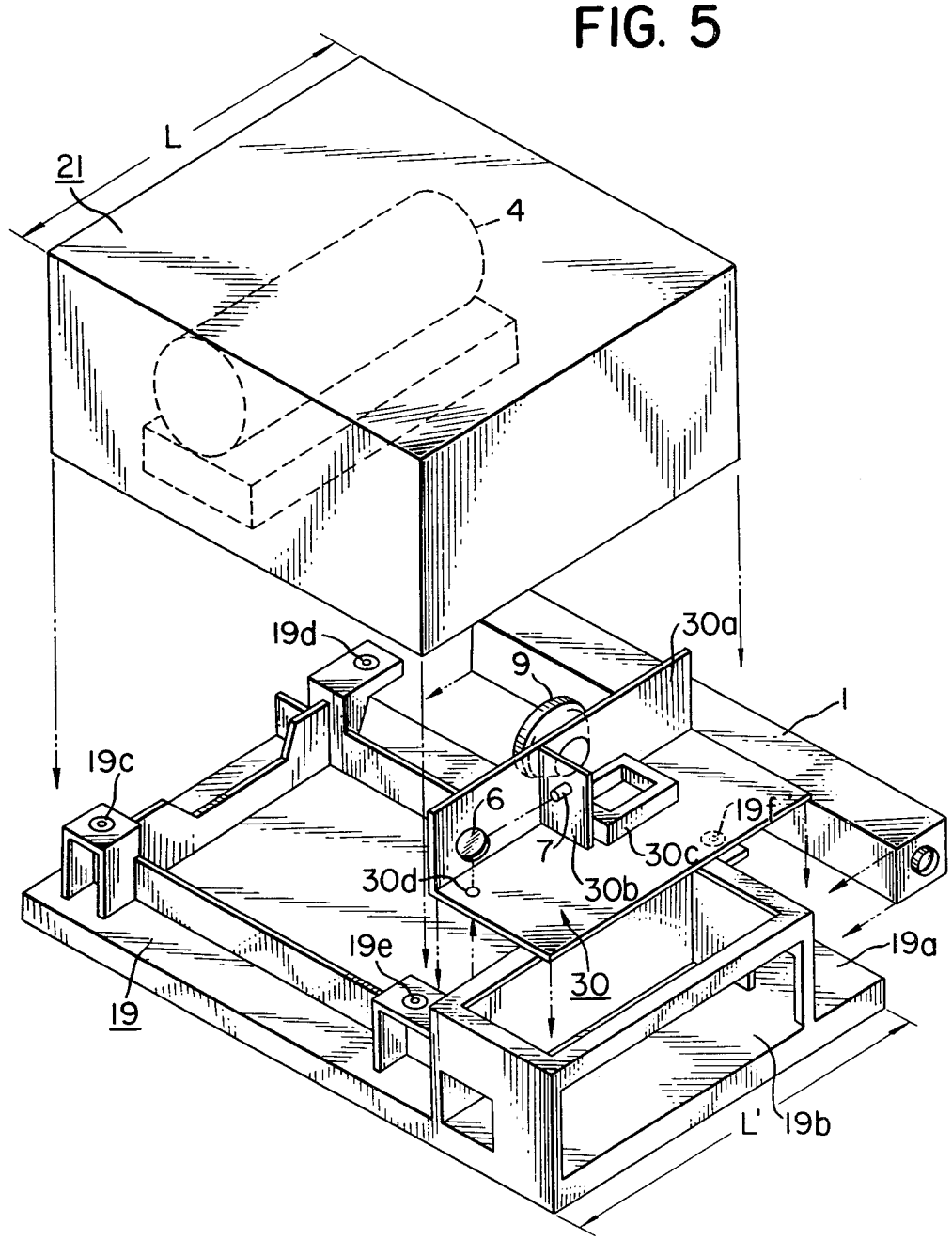
FIG. 5 is a perspective view showing, in an exploded manner, the relation of mounting between the recording section shown in FIG. 1 and the mounting bed for the various optical elements.

The optical bed 19 mounting thereon the various optical elements such as laser oscillator 1, modulator 3, optic axis adjusting mirrors 2, 5, 6, beam expander 7, polygonal rotatable mirror 8, motor 11, f-θ lens 9, etc. is configured so as to provide spaces, mounting holes and support portions which are suitable for other members to be mounted, as shown in FIG. 5, and it may be made lighter in weight by using cast aluminum of thick plate of aluminum as the material therefor. Moreover, the hollow box-like construction of the optical bed contributes to the minimization of the torsion, distortion or other deformation of the bed.

The laser oscillator 1 is mounted on the recess 19a of the bed 19 and fixed thereto and may preferably be sealingly shielded against light by side plates or the like. The He-Ne laser oscillator used with the present invention is very long and its length is approximate to the width of the body of the recording section 21. Therefore, by disposing the laser oscillator 1 below the rotating shaft of the recording drum 4, preferably below the back side of the recording section as viewed in FIG. 5, the depth L' of the optical bed 19 may be made equal to the depth L of the recording section body determined by the recording drum 4.

The modulator 3 shown in FIG. 1 is mounted within a space 19b in the bed 19. On top of the space 19b, a mounting plate 30 may be mounted from above, which plate is formed of aluminum like the optical bed 19. The mounting plate 30 has a lens mounting plate 30a rising in an L-shape, and the aforementioned f-θ lens is attached to the back side of the plate 30a while the mirror 6 is attached to the front side of the plate 30a. Designated by 30b is a plate member for mounting therein the beam expander 7, and a plate 30c for mounting and adjusting the rotatable polygonal mirror driving motor 11 is fixed to the mounting plate 30 behind the plate member 30b (as viewed in the direction of the optical path). The mounting plate 30 is formed with a through-aperture 30d having a required diameter and located so as to permit the beam to pass therethrough to the mirror 6.

Above the optical bed 19 and behind the mounting plate 30 (as viewed in the direction of the optical path), the recording section 21 to which the above-described electrophotographic process is applicable is mounted in such a manner that it fits onto the optical bed 19 by lowering as indicated by arrows in FIG. 5.

In the shown case, such manner of mounting is accomplished by the four legs (not shown) of the recording section body fitting into reception holes 19c, 19d, 19e and 19f formed on the optical bed to thereby couple the recording section body 21 to the optical bed 19.

Also, the relative inclination of the body 21 and the bed 19 may be adjusted by forming the legs with threads so as to vary the amount of projection of each leg from the body 21 and by adjusting the lengths of such projections. The adjustment of the relative inclination of the body 21 and the bed 19 is not restricted to such leg length adjust means using the threads but may also be accomplished by spacers of different thicknesses being interposed between the legs and the reception holes.

As will be appreciated, the features of the construction of the information recording apparatus to which the optic axis adjusting mirror of the present invention is applicable are summarized as follows:

(1) The separate constructions of the recording section and the optical bed readily permit a combination or replacement between various types of recording sections and an optical bed for mounting various types of optical elements. In this case, a well-known electrophotographic copying machine may be applied to the recording section without being greatly modified in design.

(2) The fact that the laser oscillator lies below the axis of the recording drum in the recording section makes it easier to construct the independent portion as the optical bed.

(3) The optical bed which takes the basically L-shaped box-like form comprising the mounting portion 30 as the vertical plane portion with respect to the horizontal plane portion suffers less from deformation such as torsion, distortion or the like and this is desirable as the mounting reference bed for optical elements such as mirrors, lenses, etc.

(4) The box-shaped recess formed circumferentially of the bed is utilized to mount various optical elements, so that adjustment and replacement of the optical elements may be readily effected from the lateral of the circumference of the bed. Also, these optical elements may simply be sealed against light by side plates being attached to surround the recess.

(5) The L-shaped form of the bed basically comprising a horizontal plane portion and a vertical plane portion enables a greater length of optical path to be scanned without the floor space being enlarged.

(6) Since the laser oscillator is located below the axis of the recording drum in the recording section, the floor space may be minimized even if the laser oscillator is large-sized, thus enabling the entire apparatus to be designed compactly.

Mirror Holder

Figure 6:
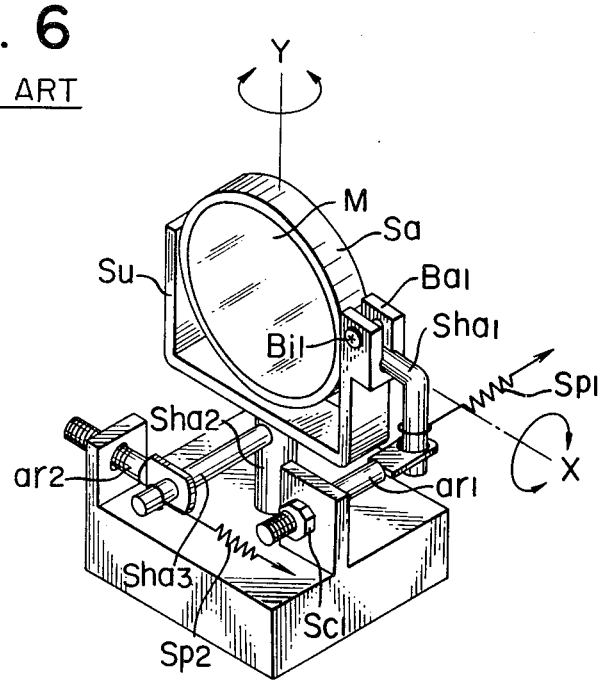
FIG. 6 shows, in perspective view, a prior art mirror and an adjusting member therefor.

FIG. 6 shows an example of the mirror holder which has heretofore been used in the optical device according to the prior art. In this Figure, a special mechanism is adopted to make the mirror M adjustable about the X- and Y-axis orthogonal to each other. First, to make the mirror M rotatable about the X-axis, a fixed shaft $Sha_1$ is supported to the support frame Sa of the mirror M by means of a split bearing portion $Ba_1$ so as to permit rotation of the mirror about the X-axis. The shaft $Sha_1$ is fitted in an arm $ar_1$ which permits the shaft to be rotated about the X-axis against the action of a spring $Sp_1$, the arm being secured to the main body by a screw $Sc_1$.

On the other hand, in order to permit the adjustment of the mirror about the Y-axis to be effected independently of the above-described adjustment about the X-axis, a support frame Su integral with the bearing portion $Ba_1$ is provided to partly surround the circumference of the mirror M, and a shaft $Sha_2$ is secured to the lower portion of the support frame Su and is also secured to a shaft $Sha_3$ to permit rotation of the mirror about the Y-axis. This shaft $Sha_3$ is in turn fitted in an arm $ar_2$ which actually effects the adjustment of the mirror about the Y-axis against the action of a spring $Sp_2$, the arm $ar_2$ being mounted so as to be secured by a screw.

In the above-described mechanism, it is necessary to lock the adjustments about the X- and the Y-axis after these adjustments have been effected. To lock the adjustment about the X-axis, it is necessary to fasten the split bearing portion by means of a screw $Bi_1$ to thereby fix the shaft $Sha_1$ and likewise fasten and fix the shaft $Sha_2$ by means of another screw or like means. Such fastening for the purpose of locking has readily caused fine rotational movements of the already adjusted shafts $Sha_1$ and $Sha_2$ and this has made it nearly difficult to effect fine adjustments of the mirror about the X- and the Y-axis.

Figure 7A:
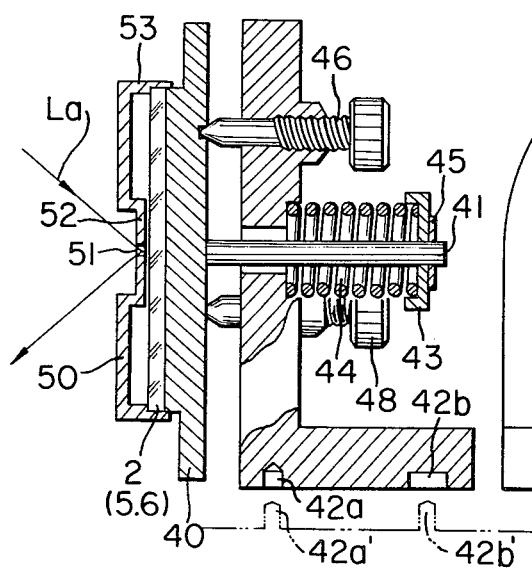
FIG. 7(A) is a partly broken-away front view of a mirror holder applicable to the apparatus of FIG. 1 and showing an optic axis detecting jig mounted on the holder.

In contrast, the device shown in FIGS. 7(A), (B) and (C) is an embodiment of the mirror holding and adjusting device which eliminates the above-noted disadvantages peculiar to the prior art device.

Figure 7B:
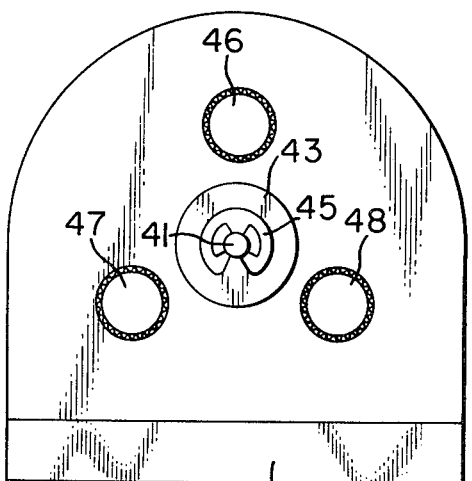
FIG. 7(B) is a right-hand side view corresponding to FIG. 7(A).

FIG. 7(A) is a partly broken-away view showing a specific construction whereby any one of the aforementioned three mirrors 2, 5 and 6 for deflecting the optical path may be supported on a holding bed, FIG. 7(B) is a right-hand side view thereof and FIG. 7(C) is a right-hand side view of a mirror fixing plate. The holder means for the respective ones of the three mirrors are entirely identical in form and therefore, description will now be made with the mirror 2 taken as an example.

The mirror 2 is fixed to a mirror fixing plate 40 having a mounting shaft 41, which extends loosely through a mirror holding bed 42, and a compression spring 44 is wound around the shaft 41 between a keep member 43 secured to one end thereof and the holding bed 42. Designated by 45 is a fastening washer for fixing the keep member to the shaft 41.

Adjust screws 46, 47 and 48 are provided to support the mirror fixing plate 40 in a three-point fashion against the action of the spring 44, and these screws are threaded into the holding bed 42 in the manner as shown. The rotation of each of these screws may adjust the amount of projection of the screw end from the holding bed 42 to thereby enable the inclination of the mirror with respect to the holding bed 42 to be varied in any desired direction.

For this purpose, the end portion of each screw 46, 47, 48 is formed in a substantially spherical shape and as shown in FIG. 7(C), a spherical hole 40a for engageably receiving the end of one of the screws is formed at a portion of the surface of the mirror fixing plate 40 against which the end of said one screw bears, while a slot 40b for permitting movement of another screw or inclination of the mirror in a predetermined direction is formed at a portion of the surface of the plate 40 against which the end of said another screw bears. Also, the screws and the screw receiving holes are designed such that, as shown, there are provided close fit portions and fine clearance fit portions, and highly viscous liquid such as silicone oil or the like is enveloped into the clearances of the latter portions to thereby endow an anti-vibration effect with respect to the alignment of the screws, as well as an anti-loosening function, thus minimizing the angular displacement of the mirror.

With such construction, the screws 46, 47 and 48 may be independently adjusted against the action of the spring 44 to enable the mirror 2 (5, 6) to be inclined in any desired direction with respect to the holding bed 42 and, once adjustment has been effected, the positional relation between the end of each screw and the back side of the mirror fixing plate 40 may be fixedly maintained in an approximately locked condition if the spring force of the compression spring is preset to a value greater than the gravity of the mirror and its holder member 40.

To enable the holding bed 42 thus holding the mirror in its desired position to be mounted on the body of the recording apparatus, the bed 42 is formed with positioning holes 42a and 42b which may be received over screws 42a' and 42b' studded on the apparatus body. The holes 42a and 42b are formed as a circular hole and a slot, respectively, thereby maintaining the bed 42 and the apparatus body fitted together in a predetermined position with the slot 42b serving to prevent the tendency of the holding bed 42 to rotate about the screw 42a'.

The advantage of the mirror holder means in this embodiment will become more apparent if compared with the conventional holder means of this type.

The conventionally used mirror holder means of this type is of a very much complicated design for biaxial movement, as exemplarily shown in FIG. 6, wherein two independently movable adjust members are fitted together in order to cause swinging thereof about a certain axis and swinging thereof about an axis orthogonal to said certain axis so as to permit inclination of the mirror in any desired direction, and in addition to these movements about the respective axes, the two adjust members must be locked at their adjusted positions once the adjustment has been effected and this has led to the necessity of providing springs which may resist the movements in the respective directions and moreover, some fine positional deviation has occurred during the locking or some play has unavoidably occurred due to the fitting movement between the two members, thus resulting in unreliable locking.

In the embodiment of the present invention, the complexity of construction and instability of the locking which are the disadvantages peculiar to the prior art may both be improved or eliminated, and this is accomplished by using the three-point support adjust member and the resilient member wound to surround the mirror supporting shaft between the screws of the adjust member and by causing the adjust member and the resilient member to cooperate with each other to highly ensure the adjustment of the mirror in any desired direction and the locking action after said adjustment without any play being produced.

Optic Axis Adjust Means

As will be seen in FIGS. 1 and 2, the laser beam La oscillated from the laser oscillator 1 must be directed to the center of the input aperture of the modulator 3 by the mirror 2, and then directed therefrom to the center of the input aperture of the beam expander 7 by the mirrors 5 and 6. For this purpose, it is necessary to effect fine adjustment of the angles of inclination of the mirrors 2, 5 and 6 with respect to the holding bed and set these angles so as to cause the laser beam to follow a predetermined optical path, namely, to render the laser beam optically straight. This is the reason why the optic axis adjust means is required. In the present embodiment, such optic axis adjust means may be provided by fitting to each mirror 2, 5, 6 a jig having a small aperture at the center thereof and adjusting the angle of inclination of each mirror so that the laser beam may pass through the center of said small aperture, thereby optically aligning the optic axis.

FIGS. 8 and 9 are perspective views showing a form of such jig. In FIG. 7(A), the jig is shown in its position where it is fitted to the surface of the mirror, and in the perspective view of FIG. 9, it is shown in its position before it is fitted to the mirror.

This optic axis adjusting jig 50 has a depressed surface 52 having a tiny aperture 51 at the position corresponding to the center of the mirror 2 and a flanged mounting portion 53 used for the jig to be mounted to the mirror. The jig is designed such that when the flanged portion has been fitted to the mirror, a slight clearance is left between the depressed surface 52 and the mirror surface. This is intended to prevent the depressed surface of the jig from contacting the mirror surface to injure the latter surface during attachment and detachment of the jig with respect to the mirror.

Similar jigs to be fitted to the mirrors 2, 5 and 6 each are prepared and during the adjustment of the optic axis, the respective jigs are fitted to the surfaces of the mirrors 2, 5 and 6 in the manner as shown in FIGS. 7(A) and 9.

The laser oscillator 1 is adjusted in its mounted condition so that the laser beam emitted from the laser oscillator 1 may impinge on the surface of the mirror 2 through the center of the tiny aperture of the so fitted jig 50, whereafter the laser oscillator is fixed to the optical bed 19. FIG. 7(A) illustrates the manner in which the beam impinges on the center of the mirror 2 and is reflected thereby.

Subsequently, by causing the laser beam emergent from the mirror 2 to pass to the input aperture of the modulator 3, the modulator 3 is adjusted in its mounted condition so that the primary wave of the laser beam from the modulator 3 may pass through the center of the tiny aperture of the jig 54 fitted to the surface of the second mirror 5, whereafter the modulator 3 is fixed to the bed 19. After being so fixed, the fine adjustment of the mirror may be accomplished by adjusting the adjust screws 46, 47, 48 of the mirror 2 so as to provide the above-noted relations, thereby aligning the optic axis.

Subsequently, the adjust screws of the second mirror 5 are adjusted so that the laser beam reflected by this mirror 5 may pass to the center of the tiny aperture in the jig 55 fitted to the surface of the third mirror 6.

Further, the adjust screws of the third mirror 6 are finely adjusted so that the laser beam emergent from this mirror 6 may pass through the center of the input aperture of the beam expander 7. In this case, it is preferable that the beam expander 7 be fitted with another jig designed such that its tiny input aperture is aligned with the axis of the expander at the input side thereof.

The beam expander, when mounted, is set so that the optic axis subsequent to the beam expander may pass through a predetermined position and thus, it is set so that if the beam is reflected from the third mirror to come to the center of the input side of the beam expander, a normal optic axis may be provided thereafter.

The size of the tiny aperture in the jig fitted to the surface of each mirror may preferably be in the range from the beam diameter of the laser beam in use to several times the beam diameter. Further, another jig having a tiny aperture may be mounted on the front of the modulator so as to ensure the laser beam properly pass to the input aperture of the modulator.

Highly precise adjustment of the optic axis is feasible in the manner as described above and, once the adjustment has been completed, the adjust screws are locked in their adjusted positions by the cooperation thereof with the aforementioned spring, whereby highly precise alignment of the optic axis may be maintained.

The conventional method of adjusting the optic axis has involved cumbersome procedures of machining a mount plate to which the mirrors are mounted, and subsequent procedures of aligning the optic axis, the procedures of machining including the steps of forming a through-hole in the mount plate, mounting in such hole an optic axis adjusting jig having a target like a small aperture, and adjusting the angles of inclination of a plurality of mirrors while watching the target. Alternatively, where a flatly formed mount bed for optical elements is used, there have been involved difficult procedures of putting up screen-like plates individually at the entrance and the exit side of each optical element such as mirror or the like and forming a reference hole for the optic axis adjusting in a surface of the plate, and it has been difficult to align the optic axis by simple adjustment with the mirrors mounted on the bed.

The features of the optic axis adjust means described in connection with the present embodiment are as follows:

(1) Since a long optic axis is divided into a plurality of optical path sections and the mirrors or like optical elements and the optic axis adjusting targets are designed so that the optic axis may be adjustable for each optical path section, the adjustment can be accomplished with ease and high accuracy.

(2) Whenever the optic axis becomes improper for some reason or other, a jig having a target such as tiny aperture or the like may be fitted for each optical path section so that the improper point can be early detected and quickly corrected.

(3) During replacement of the optical elements, the optic axis adjustment can be effected in series by the use of the above-described jigs, thus enabling the retrieval to be confirmed with ease.

(4) With the mirrors remaining in their mounted position, the optic axis can be adjusted by the use of the fine adjust screws associated with the respective mirrors and moreover, once the adjustment has been effected, highly precise positioning can be maintained without any lock means being resorted to.

Means for Removing Ghost Images

Reference will now be had to FIGS. 10 through 13 to describe the method of and means for removing ghost images in the present embodiment.

Generally in the recording apparatus using a laser beam, the use of the laser beam as the light source causes various ghost images to be unavoidably created in the path of the laser beam or in the surfaces of operative members when the laser beam is subjected to an optical treatment. Many of these ghost images move on the recording medium with the beam scanning and their energy intensity integrated with time is very weak. However, where a polygonal mirror is used as the beam scanner, a stationary ghost image may be created on the recording medium in spite of the fact that the laser beam is scanning under the coexistence of the focusing lens and the recording medium. Depending on the intensity of the laser beam, such ghost image may have a very high energy integrated with time, as a result of which the ghost image may be visualized or otherwise adversely affected during the image formation. If such ghost image is avoided only in a direction parallel to the scanning direction of the beam, the effective width of the recording medium will necessarily be limited. In other words, the size of the recording medium will be limited and accordingly, the size of the resulting image will also be limited. Another feature of the present invention is to solve this problem and to provide a method of forming an image without the width of the recording medium being limited.

To realize such a feature, the information recording apparatus to which the device of the present invention is applicable is of the type which has a mechanism for directing a parallel beam to the recording medium by a rotating polygonal mirror through a lens system also having the focusing function, wherein the angle $\theta$ formed by the parallel beam directed to the polygonal mirror with respect to the axis of rotation of the polygonal mirror is in the relation that $\theta \neq 90°$, thereby directing the parallel beam to the polygonal mirror. The parallel beam may usually be a laser beam, and the recording medium may be a conventional photosensitive medium having a photoconductive layer or a photosensitive screen having a number of tiny openings for modulating ion flows or charged dye particles.

The reason why a stationary ghost image is created on the recording medium in the recording apparatus using the laser beam as hitherto described will now be explained by reference to FIGS. 12 and 13.

Figure 12:
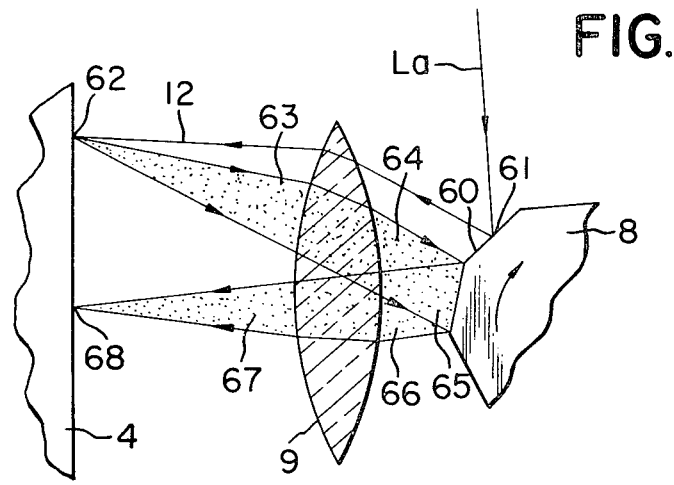
FIGS. 12 and 13 illustrate the principle on which the ghost images occur and are removed.
Figure 13:
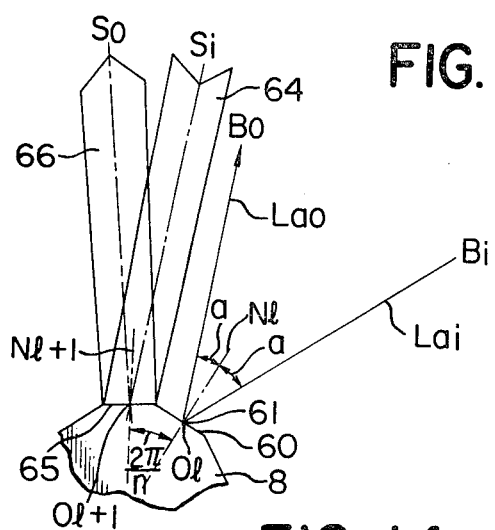

FIG. 12 schematically depicts the positions of the aforementioned rotatable polygonal mirror 8, the focusing lens 9 and the photosensitive drum 4, and straight arrows in the Figure indicate the laser beam emitted from the laser oscillator 1. The laser beam La from the beam expander 7 shown in FIG. 1 impinges on the rotatable mirror 8 and is reflected at a point 61 on the lth surface 60 of the rotatable mirror. The laser beam La enters the focusing lens 9 and as the result, it is focused at the point (image point) 62 on the photosensitive drum 4, whereby desired image exposure is effected on the drum 4. From the image point 62 during the exposure, reflected rays (scattered rays) are emitted in all directions. Of these scattered rays, the weak laser beam 63 having arrived at the focusing lens 9 is collimated into a parallel beam 64 by the lens 9 and reaches the rotatable mirror 8. Also, the laser beam reflected by the (l+1)th surface 65 of the rotatable mirror 8 adjacent to the surface 60 is likewise collimated into a parallel beam 66 and reaches the focusing lens 9.

The above-mentioned beam 66 is made into a focused beam 67 by the lens 9 and again focused at a point 68 on the photosensitive drum 4, and this is the stationary ghost (see FIGS. 11 and 12). Why the ghost image at the point 68 is created in a stationary state in spite of the rotatable mirror 8 being in rotation will now be verified by reference to FIG. 13.

Assuming that the rotatable polygonal mirror is an n-surface mirror, the angle formed between the normal to the lth surface and the normal to the (l+1)th surface is $2\pi/n$. Therefore, the angle formed between the beam Lao which is the reflected light of the laser beam Lai providing the incident beam and the normal to the (l+1)th surface 65 may be expressed as:

$$(2\pi/n) - <B_oO_lN_l = (2\pi/n) - a = <Sio_{l+1}N_{l+1}$$

where $<B_oO_lN_l$ is the angle formed between the beam Lao and the normal to the lth surface and will hereinafter be simply abbreviated as a. Further, $<Sio_{l+1}N_{l+1}$ is the angle formed between the parallel laser beam 64 and the normal to the (l+1)th surface 65.

Accordingly, the parallel beam 64 is reflected at an angle of $(2\pi/n) - a$ with respect to the normal to the (l+1)th surface 65. Thus, the angle $\psi_1$ formed by the beam 66 is:

$$\phi_1 = <BiO_lBo + BiO_{l+1}So$$
$$= 2a + 2(\frac{2\pi}{n} - a) = \frac{4\pi}{n}$$
$$= \text{constant.}$$

Thus, the angle $\psi_1$ is constant independently of the value of a. However, $<BiO_lBo$ is the angle formed between the laser beam Lai and the beam Lao, and $<BiO_{l+1}So$ is the angle formed between the parallel beam 64 and the parallel beam 66.

The rotatable mirror used in the recording apparatus of the above-described embodiment is an eight-surface mirror and reflects the laser beam in a direction parallel to the axis of rotation of the photosensitive drum 4. Thus, the ghost image is formed in a stationary state at the point 68 on the photosensitive drum whereat $\psi_1 = \pi/2$.

In the foregoing, the case has been considered in which the light reflected or scattered from the single point 62 on the photosensitive drum 4 is incident or reflected on a mirrored surface immediately adjacent to that surface of the rotatable mirror upon which the beam is first thrown. Here, if it is assumed that such phenomenon usually occurs on a mirrored surface which is adjacent with $\alpha$ surfaces interposed, the angle formed between the normal to the lth surface and the normal to the $(l+\alpha)$th surface is $2a\pi/n$ and thus, the angle formed between the laser beam La and the ghost beam is:

$$\phi_{\frac{\cdot}{\alpha}} = \frac{4\alpha\pi}{n} = \text{constant.}$$

Thus, there is created another ghost image also stationary on the photosensitive drum.

For the reason set forth above, stationary ghost images are created. The general positional relation between these ghost images is indicated at 68 in FIG. 11. This shows that a stationary ghost image is present on the locus of the image point of the scanning beam 12 on the photosensitive drum 4. Such ghost image is not preferred because it will appear as an image on the resultant hard copy if the energy integrated with time is great as already described. An example of the method of removing such ghost image which is a feature of the apparatus to which the present invention is applied will hereinafter be described by reference to FIG. 11.

The basic components of FIG. 11 are common to those in the apparatus of FIG. 10. In this example, the laser beam thrown upon the rotatable mirror is designed to be deviated from 90° with respect to the axis of rotation of the rotatable mirror in order to remove the above-described harmful ghost images. As the result, the scanning beam 12 reflected from the rotatable polygonal mirror 8 also travels in a direction deviated from 90° with respect to the axis of rotation of the rotatable mirror 8. By this, the portion in which the ghost images are created may be removed from the surface scanned by the scanning beam, as will be apparent from what has been described in connection with FIG. 12. More specifically, the scattered light from the image point 62 of the scanning beam 12 on the photosensitive drum 4, as already described in connection with FIG. 12, is collimated into a parallel beam by the f-$\theta$ focusing lens 9, and thereafter reflected by the rotatable mirror 8 and again passed through the focusing lens 9 to form a ghost image 68' on the photosensitive drum. However, this ghost image does not lie on the locus of the scanning beam 12 on the surface of the photosensitive drum 4 because the angle formed between the parallel beam formed by the scattered light from the image point 68 and the axis of rotation of the rotatable mirror is deviated from 90°. It follows from this that if the ghost image is deviated from the position which enables it to be written in the photosensitive drum 4, such stationary ghost image will affect the photosensitive drum 4 in no way. Also, if a ghost image should be created at a position which enables it to be written in but which does not overlap the scanning beam, such position may be interrupted by a member for intercepting the ghost image.

In order to change the direction of incidence of the laser beam to scan, the optic axis of the beam expander 7 may be inclined upwardly or downwardly by an angle $\theta$ with respect to the plane perpendicular to the axis of rotation X'-X' of the rotatable polygonal mirror 8. More specifically, in FIG. 11, the beam expander 7 and the third mirror 6 are inclined downwardly by the angle $\theta$ in said direction from their positions 7' and 6' before changed, whereafter they are held at positions 7 and 6, respectively.

By doing so, the stationary ghost image created at 68 on the surface of the photosensitive drum is caused to deviate downwardly from the scanned position by $2f\theta$ with respect to the angle of inclination $\theta$ of the laser beam incident on the rotatable mirror, as per the above-described theoretical analysis.

Alternatively, the angle of inclination $\theta$ may of course be provided by inclining the optic axis of the beam expander upwardly with respect to the plane perpendicular to the axis of rotation X'-X', instead of downwardly as in the shown example, whereby the stationary ghost image on the drum surface may be caused to impinge with an upward deviation of $2f\theta$ from the scanned position.

By the above-described method, it has become possible to remove the stationary ghost light and accordingly prevent any ghost image from occurring in the final copy image due to the stationary ghost. It has also become possible to separate the stationary ghost image from the scanning beam and this has eliminated the dimensional limitations of the recording medium which has heretofore arisen from the necessity of avoiding the stationary ghost image.

Laser Beam Detecting Means

Figure 14:
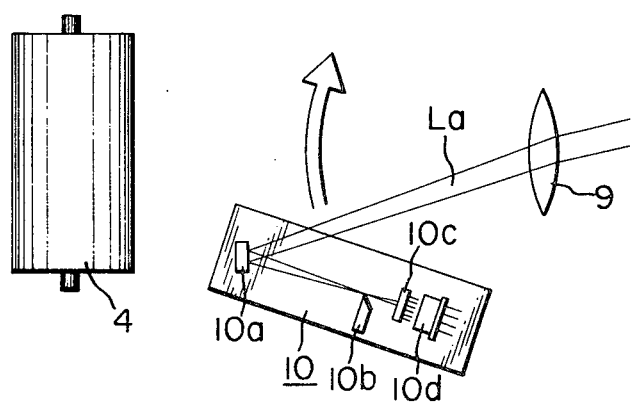
FIG. 14 is a schematic arrangement illustration showing a form of the laser beam detecting means which is applicable to the apparatus of FIG. 1.
Figure 15:
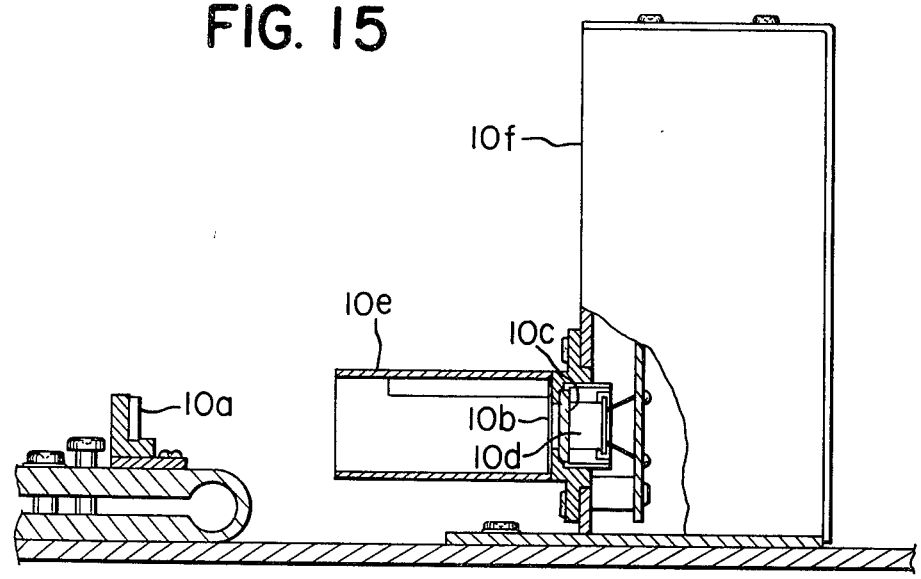
FIGS. 15 and 16 are a cross-sectional view and a perspective view, respectively, for illustrating the arrangement of the elements in the light receiving portion of FIG. 14.
Figure 16:
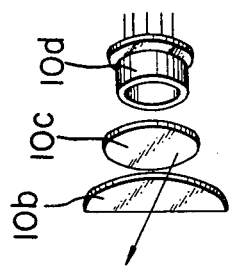

Reference will now be had to FIGS. 14 through 16 to describe laser beam detecting means applicable to the information recording apparatus according to the present invention.

In these Figures, the elements common to those already described are given similar reference characters. A beam detector unit 10 has attached thereto a mirror 10a for reflecting the portion of the information recording laser beam La between the f-θ lens 9 and the photosensitive drum 4 before it enters the photosensitive drum region. A knife edge 10b whose edge is provided by the straight portion of a meniscus is disposed at the exit side and on the focal plane of the f-θ lens 9, in such a manner that the edge of the knife edge 10b is substantially perpendicular to the scanning direction in which the laser beam is scanned. Disposed behind the knife edge is a diffusing plate 10c, behind which in turn is a light receiving element 10d, all these being attached to the beam detector unit. Designated by 10e in FIG. 15 is a hood for guiding the portion of the reflected beam which is directed toward the knife edge, and 10f a housing for protecting the light receiving element 10d and for accommodating therein an electric circuit connected to the light receiving element.

The knife edge 10b is not always restricted to the shown form but may also be means for forming an edge or slit substantially perpendicular to the scanning direction of the laser beam.

Operation of the above-described beam detecting means will now be discussed. The laser beam passed through the f-θ lens, before it scans the photosensitive drum surface, impinges on the mirror 10a at the shown position and the reflected beam therefrom is focused on the plane on which the knife edge is disposed. Accordingly, as the laser beam is scanned, the beam spot focused on said plane moves in a direction perpendicular to the surface of the knife edge and, before reaching the edge surface, the beam is intercepted from entering the diffusing plate by the base portion of the knife edge, but as soon as it leaves the edge surface, the beam directly strikes against the diffusing plate for diffusion thereby, so that the moment when the beam shifts from the interception by the edge to the passage can be detected with very high accuracy. The beam having passed by the edge is uniformly diffused by the diffusing plate so that substantially uniform light can impinge on the light receiving surface of the light receiving element 10d. Thereupon, the electrical output from the light receiving element is turned on with the entry of the beam to the edge, so that an output waveform signal can be taken out neatly in a two-value fashion, and with the time of rising of this signal as reference, it is possible to take highly accurately the timing for starting the entry of the laser beam into the recording surface of the photosensitive drum.

Further, the quantity of light entering the light receiving element may be optically adjusted by adjusting the distance between the diffusing plate 10c and the light receiving element 10d.

The effect of the above-described construction will now be described in comparison with the prior art. The conventional beam detector in the information recording apparatus of this type has been such that the beam passed through a focusing lens is received by a light receiving element disposed in the focal plane of the lens to thereby detect the arrival of the beam. In such conventional device, when use was made of a light beam such as laser beam or the like having a high energy density, the light receiving element was broken or deteriorated in performance and in addition, the output signal waveform from the element was distributed depending on the shape or position of the light receiving surface of the element on which the spot light impinged, so that accurate detection of the arrival of the beam was difficult to achieve.

In contrast, the above-described beam detecting means applicable to the apparatus of the present invention can highly accurately trace the movement of the scanning beam because the edge or slit portion of the knife edge is disposed on the image plane of the incident beam and in a direction substantially perpendicular to the scanning direction of the beam, and in addition, the beam detecting means is designed such that the beam is once diffused uniformly by the diffusing plate and then impinges on the light receiving element, whereby the output of the element has a neat two-value waveform and the time of rising of such waveform may be detected with high accuracy to thereby detect the moment when the beam crosses the edge. By this signal, the point of time whereat the laser beam starts to record on the photosensitive drum surface is determined as will later be described and thus, the above-described highly accurate detection of the arrival of the beam is of great import.

Operation of the Information Recording Apparatus

Figure 17A:
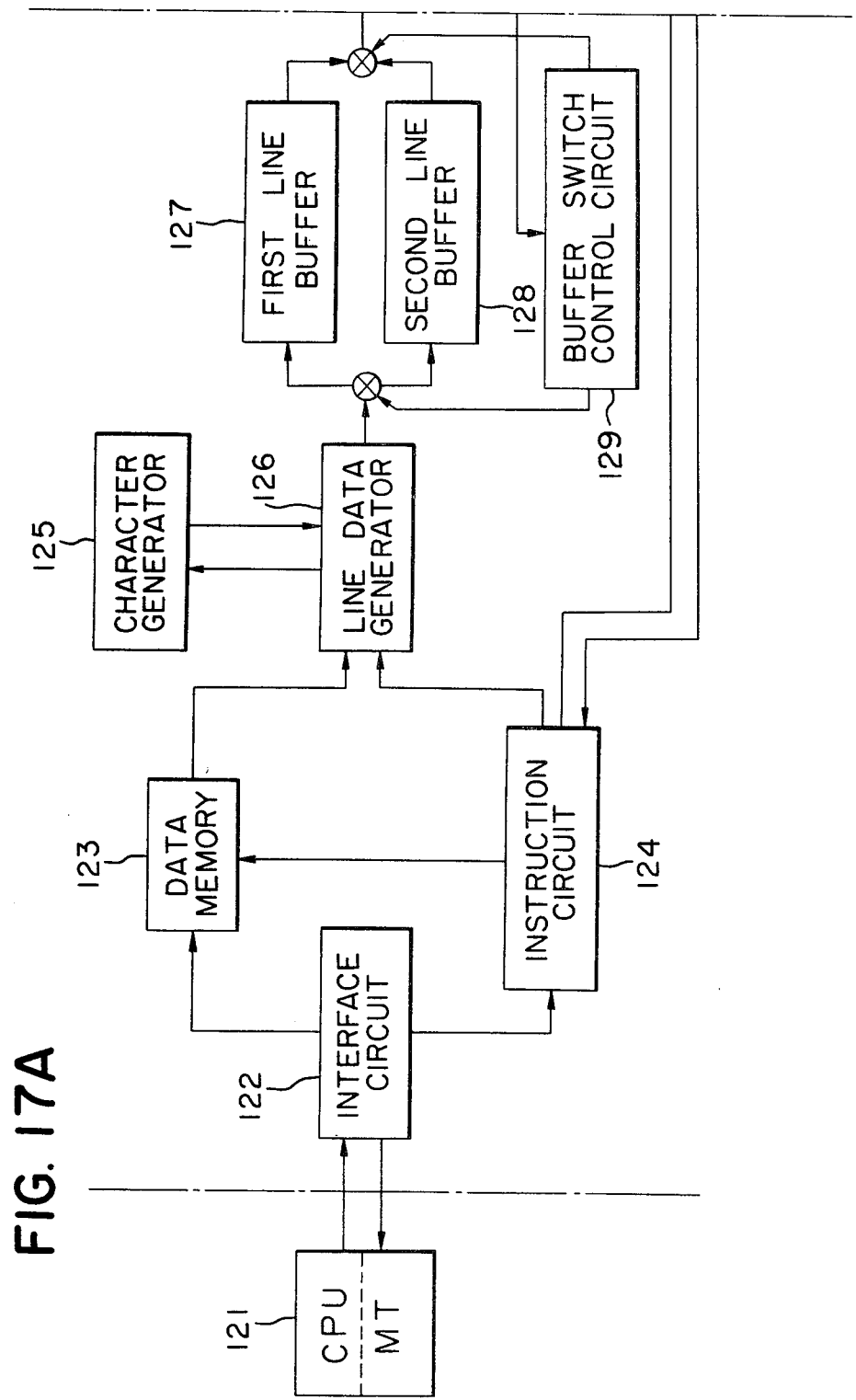
FIGS. 17A and B are a block diagram for generally illustrating the operation of the apparatus shown in FIG. 1.

In the apparatus shown in FIG. 11 and the apparatus shown in FIG. 19 which will later be described, operation from the step of receiving pattern or character information from a computer to the step of producing a desired hard copy will be described by reference to FIG. 17. The information from a computer 121 is applied directly or through a storage medium such as magnetic tape or disc to the interface circuit 122 of the present apparatus in a predetermined format. Various instructions from the computer are decoded and performed by an instruction performing circuit. The data are each stored in a predetermined quantity by a data memory 123. The data is given in the mode of binary code when it is character information, and sometimes given in the mode of picture elements forming a pattern or sometimes in the form of line data forming a pattern (the so-called vector data). These modes are designate prior to the data, and the instruction performing circuit 124 controls a data memory 123 and a line data generator 126 so as to process the data in accordance with the designated mode. The line data generator 126 generates the last data corresponding to one scan line.

More specifically, when data is given in the mode of character code, a character pattern is read from the character generator 125 and character patterns corresponding to one line are arrayed and buffered or character codes corresponding to one line are buffered, whereafter character patterns are successively read from the character generator 125 to successively prepare the data for modulating the laser beam corresponding to one scan line. Where the data are in the mode of pattern information, the data are also converted into scan line data to prepare the data for modulating the laser beam corresponding to one scan line. The data corresponding to one scan line are alternately applied to a first line buffer 127 and a second line buffer 128 under the control of a buffer switch control circuit 129, each of said line buffers comprising a shift register or the like which has a number of bits equal to the number of picture elements for one scan line.

Figure 18:
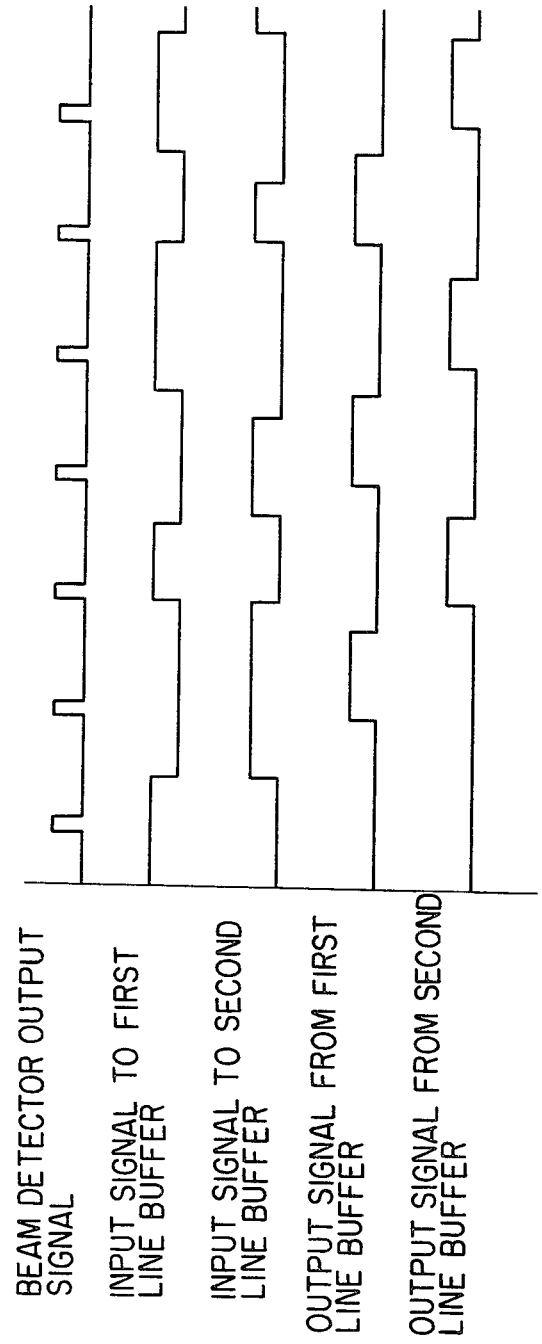
FIG. 18 illustrates the signal waveforms for the major blocks shown in FIGS. 17A and B.

Further, the data in the first line buffer 127 and the second line buffer 128 are successively read out bit by bit for one scan line with the beam detection signal from the beam detector 10 as the trigger signal, and then applied to a modulator control circuit (driver) 131. During the time when one reflecting surface scans over the photosensitive drum along a line perpendicular to the direction of rotation thereof, the data corresponding to one scan line stored in the line buffers are applied to the modulator 3, so that the light-and-dark pattern of the one scan line is imparted to the photosensitive drum 4. From the first and second line buffers 127 and 128, data are read out alternately under the control of the buffer switch control circuit 129. The time relation therebetween is illustrated in FIG. 18. As seen, when data are being read from one of the line buffers, data are being written into the other line buffer. By such system, all the data can be applied to the modulator when the interval from one reflecting surface to the subsequent reflecting surface is very short during the sweeping of the rotatable polygonal mirror 8 over the photosensitive drum 4. During the time when one scan line is scanned, the photosensitive drum 4 continues to rotate at a constant velocity, thus moving over an amount corresponding to a suitable space between scan lines.

Further, upon reception of the start instruction from the instruction performing circuit 124, the printer control circuit 143 starts to effect the printing operation while, at the same time, it returns Printer Ready signal 143a, Laser Ready signal 137a and Scanning Ready signal 138a to the instruction performing circuit 124. The signal is applied to the modulator 3 and when the first data on a page is written onto the photosensitive drum, a sheet of recording paper such as plain paper is fed by a paper feed mechanism 16a (See FIG. 4) with such a timing that the written data is transferred to the top portion of the paper in the transfer station.

In this manner, the character or pattern information from the computer 121 is put out in the form of a clear hard copy on the plain paper.

Figure 19:
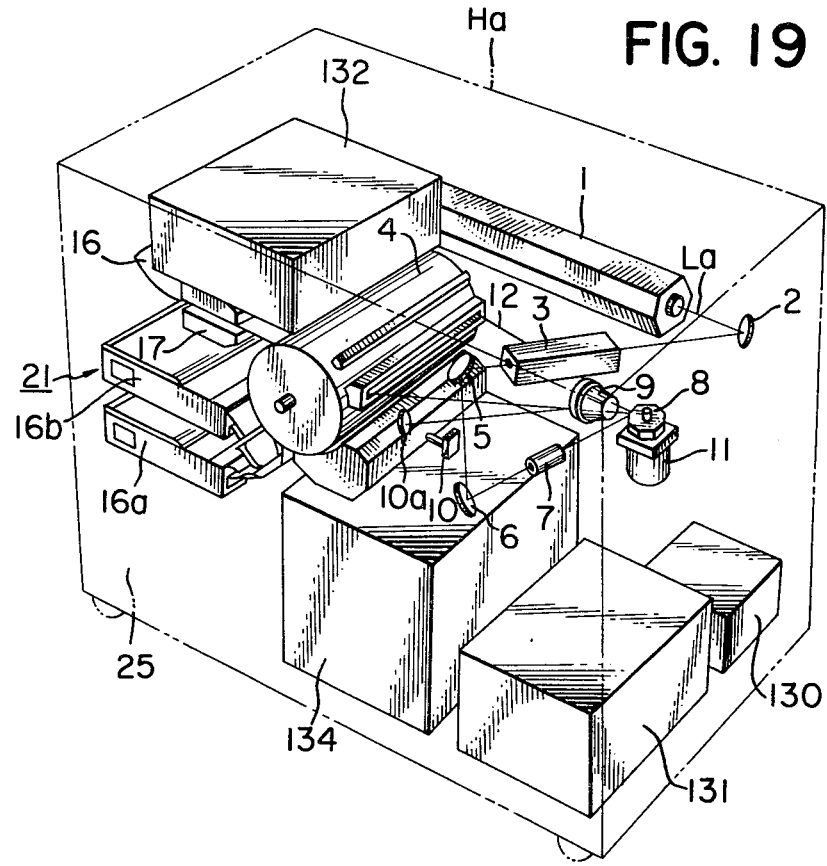
FIG. 19 shows, in perspective view, the basic construction of another embodiment of the information recording apparatus to which the present invention is applicable.
Figure 20B:
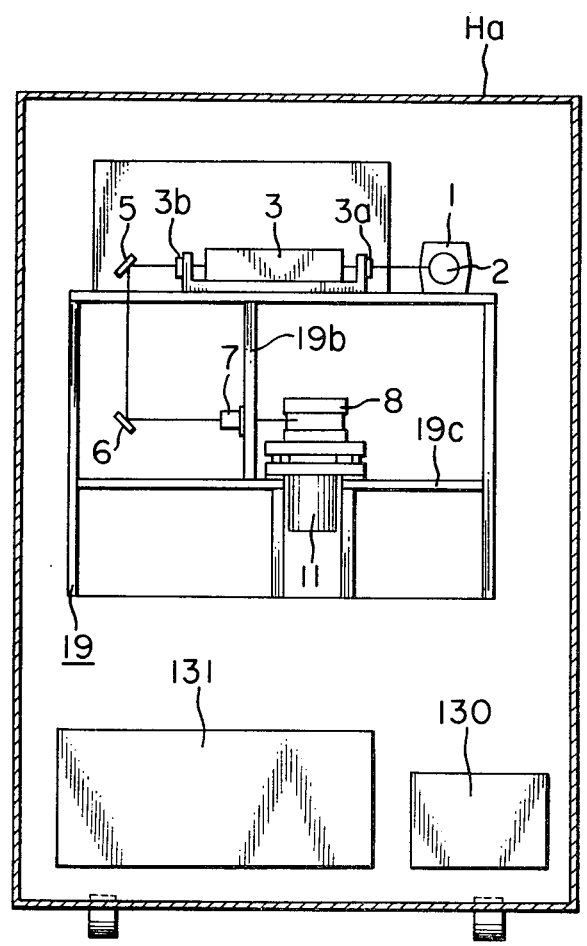
FIGS. 20(A) and (B) are a front cross-sectional view and a right-hand side view, respectively, of the FIG. 19 apparatus.

FIG. 19 shows, in perspective view, the basic construction of another embodiment of the apparatus to which the present invention is applicable, and FIGS. 20(A) and (B) are a front view and a right-hand side view, respectively, thereof. In these Figures, the elements common to those in FIGS. 1 and 2 are given similar reference characters.

In FIGS. 19 and 20, the laser oscillator 1 is disposed slightly above the photosensitive drum 4 for electrophotography rotatably supported within the housing Ha, and the laser beam La oscillated therefrom is directed via the mirror 2 to the input aperture of the beam modulator 3. Designated by 3a and 3b are lenses having condensing characteristics disposed at the input and the putput side of the modulator. The holder and optic axis adjust device for the mirror may be those shown in FIGS. 7, 8 and 9.

In the modulator 3, the laser beam is intensely or weakly modulated in accordance with the later-described extraneous input signals to the modulator 3. The laser beam from the modulator 3 is deflected downwardly perpendicularly by the mirror 5 and further deflected horizontally by the mirror 6 and directed to the beam expander system 7. The mirrors 2, 5 and 6 are movable in X-Y directions and have their reflecting surfaces rotatable as already described in detail, so that irrespective of the direction of the beam leaving the modulator, the laser beam La may be caused to enter the expander 7 perpendicularly to the optic axis thereof by independently adjusting the positions of the mirrors 5 and 6. The laser beam has its beam diameter expanded by the beam expander 7 while remaining to be a parallel beam. The laser beam having its beam diameter so expanded is further passed to the polygonal rotatable mirror 8 having a plurality of mirrored surfaces. The laser beam leaving the beam expander 7 is horizontally swept by the beam expander 7. Since the mirrored surfaces of the polygonal rotatable mirror 8 are disposed parallel to the shaft thereof, the laser beam emergent from the polygonal mirror 8 is scanned in a diameter perpendicular to the vertical direction, namely, substantially in the horizontal direction. Thereafter, the laser beam is focused as a spot light on the photosensitive drum 4 by the focusing lens having the f-$\theta$ characteristic.

The laser beam 12 modulated in the above-described manner is scanned toward a display member or thrown upon the photosensitive drum 4 to form thereon a latent image, and such latent image is developed into a visible image through the electrophotographic process, and then transferred to and fixed on plain paper, which is finally put out as a hard copy.

The above-mentioned various optical elements, namely, the laser oscillator 1, the mirrors 2, 5, 6, the optical modulator 3, the beam expander 7, the polygonal rotatable mirror 8, etc., are fixedly disposed on the outer surface of an L-shaped optical base 19, and they are thus united together into a unitary block. This leads to highly wasteless utilization of the space and compactness of the entire apparatus while, at the same time, the unitary construction described above provides such as optically stable system that even if heat or vibration occurs from its exterior or interior, the system is uniformly subjected to these disturbances, whereby the responses of the respective optical elements to such disturbances may be uniformized, thus minimizing the influence of the disturbances imparted to the light beam emitted from such unit. Although the apparatus to which the present invention is applicable adopts a mechanism for preventing occurrence of vibration as far as possible, it is impossible to completely prevent such vibration and therefore, the above-described construction intends to minimize the influence of the vibration.

Also, the path of the laser beam deflected as described above is formed in a horizontal or a vertical direction, as viewed from the front or the lateral side thereof, so that the axis of rotation is scanned in a vertical direction so as to contribute to causing the beam to horizontally impinge on the photosensitive drum as will be described later.

The recording section 21 will now be discussed by reference to FIG. 20(A). The electrophotographic process applied herein may be the same as that previously described, but is not restricted thereto, of course. The insulative layer surface of a drum-shaped photosensitive plate 4 basically comprising a conductive back-up member, a photoconductive layer and an insulative layer is uniformly pre-charged to the positive or the negative polarity by a first corona charger 13, disposed adjacent to the peripheral surface of the photosensitive drum, to cause charges opposite in polarity to such charging polarity to be captured in the interface between the photoconductive layer and the insulative layer or in the interior of the photoconductive layer, whereafter the laser beam 12 is thrown upon the charged insulative layer surface while, at the same time, AC corona charge is applied to the same surface by an AC corona discharger 14, disposed around the periphery of the drum, to thereby form on the insulative layer surface a pattern resulting from the surface potential difference created in accordance with the light-and-dark pattern of the laser beam 12, and then the insulative layer surface is uniformly exposed to light by a lamp 14a adjacent to the drum to thereby cause an electrostatic image with high contrast to be formed on the insulative layer surface, whereafter the electrostatic image is developed into a visible image by a developing device 15 with the aid of a developer composed chiefly of charged toner particles, and then a transfer medium 16 such as paper or the like is fed to the drum surface selectively from transfer medium containing cassette 16a or 16b by either of feed roller 16c or 16d, so that the visible image is transferred to the transfer medium by transfer means 13' and through utilization of an internal or external electric field. Subsequently, the transfer medium is separated from the drum surface, whereafter the transfer image is fixed by fixing means 17 such as infrared ray lamp or heating plate to thereby provide an electrophotographic print, which is then discharged onto a discharge tray. On the other hand, after the image transfer, the insulative layer surface is cleaned by a cleaning device 18 to remove any residual charged particles, thus rendering the photosensitive plate 4 ready for reuse.

The developing means 15 used in the electrophotographic recording section 21 is of the dry type, but this offers a problem of scattered dry toner. In the shown embodiment, to prevent the scattered toner from affecting other elements, the developing means 15, cleaning means 18 and other means which may readily be subjected to scattered toner particles are covered with a block and in addition, a hood 9a is provided around the path of light from the f-θ lens to protect its environment against the influence of the scattered toner.

As noted above, the electrophotographic recording section is formed into a unit and such unit is mounted with the optical unit, thereby uniformizing the positional variation attributable to the disturbances such as mechanical vibration and the like and thus uniformizing the position of passage of the beam, which in turn leads to minimization of the influence of those disturbances imparted to the light beam impinging on the photosensitive medium.

In FIGS. 19 and 20, various electrical control sections as shown in FIG. 1 are provided above and below the laser beam recording section 21 and the optical means mounting section.

Reference will further be had to FIGS. 19 and 20 to describe such a form of the mechanical construction, although it is similar in numerous points to that shown in FIG. 1.

Like that shown in FIG. 14, the optical bed 19 mounting thereon the various optical elements such as laser oscillator 1, modulator 3, optic axis adjusting mirrors 2, 5, 6 beam expander 7, polygonal rotatable mirror 8, motor 11, f-θ lens 9, etc., is configured so as to provide spaces, mounting holes and support portions which are suitable for other members to be mounted, as shown in FIG. 20. The laser oscillator 1 is mounted on top of the bed 19 and fixed thereto and may preferably be sealingly shielded against light by side plates or the like. The He-Ne laser oscillator used with the present invention is very long and therefore, by disposing the laser oscillator 1 above the rotating shaft of the recording drum 4, preferably above the back side of the recording section and lengthwise of the apparatus, as shown, the depth of the body of the recording section determined by the length of the recording drum 4 may be reduced. On the upper surface of the bed 19, the modulator as shown in FIG. 19 is mounted at a position to receive the beam, after deflected, from the laser oscillator. On the bed 19, a cap-shaped lens mounting plate 19a depends in an L-shape, and the aforementioned f-θ lens is mounted on the back side of the plate 19a while the mirror 6 is mounted on the front side of the plate 19a. Designated by 19b is a plate member on which the beam expander 7 is mounted, and behind the plate member (as viewed from the optical path), a plate 19c for mounting and adjusting the rotatable polygonal mirror driving motor 11 is fixed to the plate member 19a.

Below the optical bed 19 and behind the mounting plate 19a (as viewed from the optical path), the recording section 21 to which the above-described electrophotographic process is applicable is mounted in such a manner that it makes a kind of fit with the L-shaped optical bed 19 in FIG. 20(A).

The apparatus of such construction has features similar to those of the apparatus shown in FIG. 1.

What we claim is:

1. A processing system for scanning a modulated light beam toward a medium for forming an image comprising:
    means for forming a modulated light beam;
    light beam scanning means;
    a medium for forming an image thereon;
    at least two reflecting mirrors; and
    means for detecting the optical axis of the light beam, each of said reflecting mirrors and associated optical axis detecting means having portions for detachably mounting them together on the reflective side of the mirror.

2. An optical axis detecting device comprising:
    at least two reflecting mirrors;
    means for adjustably supporting each of said reflecting mirrors; and
    means for detecting the optical axis of a light beam incident upon each of said reflecting mirrors;
    said reflecting mirrors and said optical axis detecting means each having detachable mating portions, and an optical axis detecting aperture provided in said optical axis detecting means to detect whether or not each of said reflecting mirror is in a predetermined position with respect to the optical axis.

3. A system for directing a light beam to a light beam receiving medium comprising:
    a light beam forming means;
    at least two reflecting mirrors;
    a medium to receive a light beam in a predetermined position; and
    means for detecting the optical axis of the light beam;
    wherein each of said reflecting mirrors and said optical axis detecting means have respective detachable mating portions in face-to-face contact with the reflective surface of the mirror.

4. A processing system for scanning a light beam toward a medium for forming an image thereon comprising:
    means for forming a light beam;
    means for scanning the light beam;
    a medium for receiving the light beam;
    at least two mirrors for reflecting the light beam in a predetermined direction; and
    means for detecting the optical axis of the light beam to be reflected by each of said reflecting mirrors, said optical axis detecting means having an optical axis detecting plane releasably disposed at a position immediately before each of said reflecting mirrors with respect to an optical path to the reflecting mirrors, each optical axis detecting plane having a detection portion and being releasable from the position during processing of the system.

5. A processing system for scanning a modulated light beam toward a medium for forming an image comprising:

means for forming a modulated light beam;
means for adjusting the optical path of the modulated light beam;
a medium for recording the modulated light beam;
means for causing the modulated light beam to scan said medium;
at least two mirrors for reflecting said modulated light beam;
means detachably mounted to each of said mirrors adjacent their reflecting surfaces for detecting the optical axis of the modulated light beam; and
means for adjustably supporting each of said reflecting mirrors with respect to the optical axis of said modulated light beam, each adjustable supporting means including a supporting member, a resilient member for resiliently connecting the associated reflecting mirror with said supporting member and an adjusting member for adjusting the optical axis of the light beam incident upon the associated reflecting mirror to a predetermined optical path.

6. A system for modulating a light beam by information signals and scanning the modulated beam toward a medium, comprising:

means for forming the modulated light beam;
means for scanning the modulated light beam;
an optical system for focusing the modulated light beam on the surface of said medium;
at least two mirrors for bending the path of said light beam; and
detecting means mounted in face-to-face relationship with the reflecting surfaces of said mirrors to detect whether or not the light beam impinging on said mirrors is deviated from a predetermined optical axis, said detecting means having a mounting portion which is detachably mountable on said mirrors.

7. A system according to Claim 6, further comprising means for supporting said mirrors to make said mirrors adjustable in three different directions.

8. A system according to claim 7, wherein said supporting means includes three adjusting screws and a common resilient member for imparting a resilient force resisting said adjusting movement without locking said adjusting screws.

9. A processing system for scanning a modulated light beam toward a medium for recording or displaying information comprising:

means for adjusting the path of the light beam including at least two light beam reflecting optical means;
a medium for receiving the light beam;
optical means for scanning the light beam toward said medium;
means for adjustably supporting said reflecting optical means with respect to the optical axis of the light beam; and
means for detecting the optical axis of the light beam including at least two members for enabling one to visually confirm whether or not the incident beam has arrived at the center of a predetermined optical axis, and means for mounting said members in face-to-face relationship with the reflective surfaces of said reflecting optical means.

10. A system according to claim 9, wherein said light beam reflecting optical means includes an optical mirror.

11. A system according to claim 9, wherein each of said members is detachably mountable and has a small aperture at a position corresponding to the center of the predetermined optical axis.

12. A system according to claim 9, wherein said means for adjustably supporting said reflecting optical means includes a plurality of members for supporting said reflecting optical means to provide a three-point support, each of said three-point support members being adjustable independent of the others.

13. A system according to claim 12, wherein said means for adjustably supporting said reflecting optical means further includes a resilient member provided independently of said three-point support members to fix said optical means in a position adjusted by said three-point support members.

14. A system according to claim 12, wherein said means for adjustably supporting said reflecting optical means further includes a bed for supporting the back side of said reflecting optical means, the back side of said bed being formed with at least one positioning recess corresponding to said three-point support members.

15. A system for scanning a light beam to process information, comprising:

means for forming a light beam modulated in accordance with information signals;
a medium disposed at a position to receive the modulated light beam and capable of recording or displaying the beam;
means for scanning the modulated light beam toward said medium;
means disposed in the path of the light beam for reflecting the beam in a desired direction;
means for detecting the optical axis of the light beam, said detecting means having a portion which is detachably mountable on said reflecting means adjacent to the reflective surface thereof; and
support means adjustable to cause said reflecting means to reflect the light beam in a desired direction of reflection, said support means being associated with said optical axis detecting means to be adjustable in accordance with the detection by said optical axis detecting means.

16. A system according to claim 15, further comprising a support structure for mounting said system, and wherein said adjustable support means includes:

a support member for directly supporting said reflecting means;
a support bed provided separately from said support member and coupled thereto by a resilient member, said support bed having a mating portion adapted to be mounted to said support structure; and
means for adjusting the relative position between said support bed and said support member.

17. A system according to claim 15, wherein said adjustable support means has independently adjustable screws for providing a three-point support for said reflecting means, and a member for imparting a resilient force resisting the adjusting movement of said screws.

18. A system for scanning a light beam to process information, comprising:
a light beam generator;
means for forming a light beam modulated in accordance with information signals;
a medium disposed at a position to receive the modulated light beam and capable of recording or displaying the beam;
means for scanning the modulated light beam toward said medium;
means disposed in the path of the light beam for reflecting said beam in a desired direction;
means for detecting the optical axis of the light beam, wherein said optical axis detecting means and said reflecting means have respective mating portions adjacent the reflective surface, and wherein an optical axis detecting portion is provided in said optical axis detecting means which detects whether or not said reflecting means is adjusted to a desired position; and
support means adjustable to cause said reflecting means to reflect the light beam in the desired direction of reflection, said support means being associated with said optical axis detecting means to be adjustable in accordance with the detection by said optical axis detecting means.

19. A system according to claim 18, wherein said optical axis detecting means is a cap-like mating member having a small aperture at the center thereof for passing the beam therethrough.

20. An information processing system using a light beam, comprising:
means for forming a light beam modulated by information signals;
means for scanning the modulated light beam;
a photosensitive medium disposed at a position where it is scanned by the light beam;
an optical system for focusing the light beam on the surface of said photosensitive medium;
a beam detector capable of receiving at least part of the light beam to detect when the light beam first impinges on said photosensitive medium;
at least two mirrors disposed at various points to bend the path of the light beam leading from said light beam forming means to said photosensitive medium;
means for adjusting the mounted positions of said mirrors, said means being adjustable to vary the angles at which said mirrors are mounted; and
means detachably mounted to said mirrors adjacent their reflective surfaces for detecting the optical axis of the light beam as it impinges on said mirrors;
whereby in accordance with the position of the light beam as it impinges on said mirrors, said optical axis detecting means detects whether or not said light beam is deviated from a predetermined optical axis.

21. An information processing system using a light beam comprising:
means for forming a light beam modulated by information signals;
means for scanning the modulated light beam;
a photosensitive medium disposed at a position where it is scanned by the light beam;
an optical system for focusing the light beam on the surface of said photosensitive medium to form an electrostatic latent image thereon;
means for developing the latent image;
at least two mirrors disposed at various points to bend the path of the light beam leading from said light beam forming means to said photosensitive medium;
means for adjusting the mounted positions of said mirrors, said means being adjustable to vary the angles at which said mirrors are mounted; and
means detachably mounted to said mirrors adjacent the reflective surfaces thereof for detecting the optical axis of the light beam as it impinges on said mirrors;
whereby in accordance with the position of the light beam as it impinges on said mirrors, said optical axis detecting means detects whether or not said light beam is deviated from a predetermined optical axis.

22. An information processing apparatus using a light beam, comprising:
a support structure;
a medium having a photosensitive characteristic with respect to the light beam and disposed at a first level of said support structure;
modulated light beam forming means disposed at a lower level with respect to said medium;
scanning means disposed above said light beam forming means and in opposed relationship with said medium for causing the light beam to scan with respect to said medium;
an optical system for focusing the scanning light beam on the surface of said medium;
a first mirror disposed between said light beam forming means and said scanning means;
a second mirror disposed between said light beam forming means and said scanning means;
means for adjusting the angle at which said first mirror is mounted to said support structure;
means for adjusting the angle at which said second mirror is mounted to said support structure;
means detachably mounted to said first mirror adjacent its reflective surface for detecting the optical axis of the light beam as it impinges on said first mirror; and
means for detecting the optical axis of the light beam as it impinges on said second mirror.

23. An information processing apparatus using a light beam, comprising:
a support structure;
a medium having a photosensitive characteristic with respect to the light beam and disposed at a first level of said support structure;
modulated light beam forming means disposed at a lower level with respect to said medium;
scanning means disposed above said light beam forming means and in opposed relationship with said medium for causing the light beam to scan with respect to said medium;
an optical system for focusing the scanning light beam on the surface of said medium;
a first mirror disposed between said light beam forming means and said scanning means;
a second mirror disposed between said light beam forming means and said scanning means;
means for adjusting the angle at which said first mirror is mounted to said support structure;
means for adjusting the angle at which said second mirror is mounted to said support structure;
means for detecting the optical axis of the light beam as it impinges on said first mirror; and means for detecting the optical axis of the light beam as it impinges on said second mirror;

wherein said respective means for detecting the optical axis of the light beam as it impinges on said first and second mirrors have cap-like mating members mounted to said mirrors in face-to-face relationship with the reflective surfaces thereof, respectively.

24. An information processing apparatus using a light beam, comprising:
- a support structure;
- a medium having a photosensitive characteristic with respect to the light beam and disposed at a first level of said support structure;
- modulated light beam forming means disposed at an upper level with respect to said medium;
- scanning means disposed below said light beam forming means and in opposed relationship with said medium for causing the light beam to scan with respect to said medium;
- an optical system for focusing the scanning light beam on the surface of said medium;
- a first mirror disposed between said light beam forming means and said scanning means;
- a second mirror disposed between said light beam forming means and said scanning means;
- means for adjusting the angle at which said first mirror is mounted to said support structure;
- means for adjusting the angle at which said second mirror is mounted to said support structure;
- means detachably mounted to said first mirror adjacent its reflective surface for detecting the optical axis of the light beam as it impinges on said first mirror; and means for detecting the optical axis of the light beam as it impinges on said second mirror.

25. An information processing apparatus using a light beam, comprising:
- a support structure;
- a medium having a photosensitive characteristic with respect to the light beam and disposed at a first level of said support structure;
- modulated light beam forming means disposed at an upper level with respect to said medium;
- scanning means disposed below said light beam forming means and in opposed relationship with said medium for causing the light beam to scan with respect to said medium;
- an optical system for focusing the scanning light beam on the surface of said medium;
- a first mirror disposed between said light beam forming means and said scanning means;
- a second mirror disposed between said light beam forming means and said scanning means;
- means for adjusting the angle at which said first mirror is mounted to said support structure;
- means for adjusting the angle at which said second mirror is mounted to said support structure;
- means for detecting the optical axis of the light beam as it impinges on said first mirror; and
- means for detecting the optical axis of the light beam as it impinges on said second mirror;

wherein said respective means for detecting the optical axis of the light beam as it impinges on said first and said second mirrors have cap-like mating members mounted to said mirrors in face-to-face relationship with the reflective surfaces of said mirrors, respectively.

* * * * *

UNITED STATES PATENT OFFICE
CERTIFICATE OF CORRECTION

Patent No. 4,171,902  Dated October 23, 1979

Inventor(s) NOBUHIRO IMAI, ET AL.

It is certified that error appears in the above-identified patent and that said Letters Patent are hereby corrected as shown below:

Column 4, line 61, change "dmin=k·f A/λ/A to $$\text{--dmin} = k \cdot f \frac{\lambda}{A} \text{--};$$

Column 13, line 6, change

"$(2\pi/n) - <B_oO_\ell N_\ell = (2\pi/n) - a = <Sio_{\ell+1}N_{\ell+1}$" to $$-- \frac{2\pi}{n} - \angle B_oO_\ell N_\ell = \frac{2\pi}{n} - a = \angle Sio_{\ell+1} N_{\ell+1'} \text{--};$$

Column 13, line 8, change " $<B_oO_\ell N_\ell$ " to -- $\angle B_oO_\ell N_\ell$ --;

Column 13, line 10, change " $<Sio_{\ell+1}N_{\ell+1}$ " to -- $\angle Sio_{\ell+1}N_{\ell+1}$ --;

Column 13, line 14, change " $(2\pi/n)-a)$ to -- $(\frac{2\pi}{n} - a)$ --;

Column 13, line 17, change " $\phi_1 = <BiO_\ell Bo + BiO_{\ell+1}So$ " to $$-- \psi_1 = \angle Bio_\ell Bo + \angle BiO_{\ell+1}So --;$$

UNITED STATES PATENT OFFICE
CERTIFICATE OF CORRECTION

Patent No. 4,171,902   Dated October 23, 1979

Inventor(s) NOBUHIRO IMAI, ET AL.

It is certified that error appears in the above-identified patent and that said Letters Patent are hereby corrected as shown below:

Column 13, line 23, change " $<BiO_\ell Bo$" to -- $\angle BiO_\ell Bo$ --;

Column 13, line 25, change " $<BiO_{\ell+1} So$" to -- $\angle BiO_{\ell+1} So$ --;

Column 13, line 48, change " $\phi \cdot_{\overline{\overline{\alpha}}} = \frac{4\alpha\pi}{n} = $ constant." to -- $\psi \cdot_{\overline{\overline{\alpha}}} = \frac{4\alpha\pi}{n} = $ constant. --;

Column 17, line 53, change "putput" to --output--.

Signed and Sealed this

Twenty-second Day of April 1980

[SEAL]

Attest:

SIDNEY A. DIAMOND

Attesting Officer    Commissioner of Patents and Trademarks